United States Patent
Kwak et al.

(10) Patent No.: US 11,216,331 B2
(45) Date of Patent: Jan. 4, 2022

(54) MEMORY SYSTEM AND OPERATING METHOD THEREOF

(71) Applicant: SK hynix Inc., Gyeonggi-do (KR)

(72) Inventors: Kang-Sub Kwak, Gyeongsangnam-do (KR); Young-Jun Yoon, Gyeonggi-do (KR); Joon-Yong Choi, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 55 days.

(21) Appl. No.: 16/802,168

(22) Filed: Feb. 26, 2020

(65) Prior Publication Data
US 2020/0192746 A1 Jun. 18, 2020

Related U.S. Application Data

(62) Division of application No. 15/951,634, filed on Apr. 12, 2018, now Pat. No. 10,606,689.

(30) Foreign Application Priority Data

Apr. 18, 2017 (KR) .................. 10-2017-0050011
Apr. 6, 2018 (KR) .................. 10-2018-0040551

(51) Int. Cl.
*H03M 13/00* (2006.01)
*G06F 11/08* (2006.01)
(Continued)

(52) U.S. Cl.
CPC .......... *G06F 11/085* (2013.01); *G06F 3/0619* (2013.01); *G06F 3/0625* (2013.01);
(Continued)

(58) Field of Classification Search
None
See application file for complete search history.

(56) References Cited

U.S. PATENT DOCUMENTS 4,435,807 A   3/1984   Scott et al.
7,366,971 B2  4/2008   Kikutake et al.
(Continued)

FOREIGN PATENT DOCUMENTS

CN   1538298 A   10/2004
CN   1627283 A   6/2005
(Continued)

OTHER PUBLICATIONS

Office Action issued by the USPTO for U.S. Appl. No. 16/802,215 dated Mar. 8, 2021.
(Continued)

*Primary Examiner* — Guerrier Merant
(74) *Attorney, Agent, or Firm* — IP & T Group LLP

(57) ABSTRACT

A memory system includes: an ECC unit suitable for generating third data by correcting second data and a third DBI flag by correcting a second DBI flag, based on the second data, the second DBI flag, and a second parity, which are provided through a channel; a DBI unit suitable for generating fourth data by determining whether a plurality of third data bits respectively corresponding to a plurality of DBI flag bits constituting the third DBI flag are inverted, based on the third data and the third DBI flag; and a DM unit suitable for generating a DM flag indicating whether a write operation is performed on a plurality of fourth data bits constituting the fourth data, based on the second data.

16 Claims, 6 Drawing Sheets

(51) Int. Cl.
  *G06F 3/06*    (2006.01)
  *G06F 11/07*   (2006.01)
  *G06F 11/10*   (2006.01)

(52) U.S. Cl.
  CPC ........ *G06F 3/0629* (2013.01); *G06F 11/0772* (2013.01); *G06F 11/1048* (2013.01)

(56) References Cited

U.S. PATENT DOCUMENTS

| | | |
|---|---|---|
| 7,894,227 B2 | 2/2011 | Inoue |
| 9,778,985 B1* | 10/2017 | Kim ................ G06F 3/064 |
| 10,606,689 B2 | 3/2020 | Kwak et al. |
| 2007/0110224 A1 | 5/2007 | Gumpel et al. |
| 2015/0254136 A1* | 9/2015 | Hoya ................ G06F 11/1012 |
| | | 714/764 |
| 2018/0076828 A1* | 3/2018 | Kanno ................ G11C 16/10 |
| 2018/0260274 A1* | 9/2018 | Inoue ................ G06F 3/0655 |

FOREIGN PATENT DOCUMENTS

| | | |
|---|---|---|
| CN | 102142270 A | 8/2011 |
| CN | 104835534 A | 8/2015 |
| CN | 106021636 A | 10/2016 |

OTHER PUBLICATIONS

Office Action issued by the Chinese Patent Office dated Sep. 29, 2021.

* cited by examiner

MEMORY SYSTEM AND OPERATING METHOD THEREOF

CROSS-REFERENCE TO RELATED APPLICATION

This application is a division of U.S. patent application Ser. No. 15/951,634 filed on Apr. 12, 2018, which claims benefits of priority of Korean Patent Application No. 10-2017-0050011 and 10-2018-0040551 filed on Apr. 18, 2017 and Apr. 6, 2018. The disclosure of each of the foregoing application is incorporated herein by reference in its entirety.

BACKGROUND

1. Field

Exemplary embodiments relate to a memory system, and more particularly, to a memory system including an ECC unit, a DBI unit, and a DM unit, and an operating method thereof.

2. Discussion of the Related Art

Semiconductor devices, which are widely used in high-performance electronic systems, are increasing in both capacity and speed. Dynamic random access memory (DRAM), which is a semiconductor device, is a volatile memory which determines data by a charge stored in a capacitor.

As the operating speed of the DRAM accelerates and the storage capacity of the DRAM increases, high reliability of data transmission and low power consumption are gradually required.

In order to increase the speed of the memory system and reduce the size of the memory system, there is an increasing need for a memory system including an ECC unit, a DBI unit and a DM unit. Accordingly, there is a growing demand for a memory system including an ECC unit, a DBI unit, and a DM unit, which are further improved.

SUMMARY

Various embodiments are directed to a method capable of optimizing an area, power consumption, and an operating time of a memory system in various cases of using all or part of an ECC unit, a DBI unit, and a DM unit.

Also, various embodiments are directed to a DM unit which operates independently of an ECC unit.

Also, various embodiments are directed to repeatedly perform a DBI operation so as to minimize transmitted or received data bits of high logic.

Also, various embodiments are directed to minimize and simplify a device and an operation to which a function of an ECC unit and a function of a DM unit are redundantly applied.

In an embodiment, a memory system includes: an ECC unit suitable for generating third data by correcting second data and a third DBI flag by correcting a second DBI flag, based on the second data, the second DBI flag, and a second parity, which are provided through a channel; a DBI unit suitable for generating fourth data by determining whether a plurality of third data bits respectively corresponding to a plurality of DBI flag bits constituting the third DBI flag are inverted, based on the third data and the third DBI flag; and a DM unit suitable for generating a DM flag indicating whether a write operation is performed on a plurality of fourth data bits constituting the fourth data, based on the second data.

The second data may include a plurality of second data groups, and the DM unit may generate a DM flag bit of high logic when the number of high logics of a plurality of bits included in each of the second data groups is equal to or greater than a masking value.

The DM unit may generate the DM flag bit of low logic when the number of high logics of the plurality of bits included in each of the second data groups is less than the masking value.

The first data may be original data before the second data passes through a channel, and the first data may include a plurality of first data groups.

The masking value may be less than a data masking pattern boundary value, and the data masking pattern boundary value may be a boundary value of the number of high logics of a plurality of bits included in each of the first data groups so as to enable the DM unit to input high logic to the DM flag, regardless of single error occurrence of the plurality of bits included in each of the first data groups.

The masking value may be greater than a data pattern boundary value, and the data pattern boundary value may be a boundary value of the number of high logics of the plurality of bits included in each of the first data groups so as to enable the DM unit to input low logic to the DM flag, regardless of single error occurrence of the plurality of bits included in each of the first data groups.

A fourth data group corresponding to the DM flag bit of high logic may be a data group on which the write operation is not performed, and the fourth data group corresponding to the DM flag bit of low logic may be a data group on which the write operation is performed.

The masking value may be 6, the data masking pattern boundary value may be 7, and the data pattern boundary value may be 4.

In an embodiment, a method of operating a memory system includes: generating third data by correcting second data and a third DBI flag by correcting a second DBI flag, based on the second data, the second DBI flag, and a second parity, which are provided through a channel; generating fourth data by determining whether a plurality of third data bits respectively corresponding to a plurality of DBI flag bits constituting the third DBI flag are inverted, based on the third data and the third DBI flag; and generating a DM flag indicating whether a write operation is performed on a plurality of fourth data bits constituting the fourth data, based on the second data.

The second data may include a plurality of second data groups, and the generating of the DM flag may include generating a DM flag bit of high logic when the number of high logics of a plurality of bits included in each of the second data groups is equal to or greater than a masking value.

The generating of the DM flag may include generating the DM flag bit of low logic when the number of high logics of the plurality of bits included in each of the second data groups is less than a masking value.

The first data may be original data before the second data passes through a channel, and the first data may include a plurality of first data groups.

The masking value may be less than a data masking pattern boundary value, and the data masking pattern boundary value may be a boundary value of the number of high logics of a plurality of bits included in each of the first data groups so as to input high logic to the DM flag in the generating of the DM flag, regardless of single error occurrence of the plurality of bits included in each of the first data groups.

The masking value may be greater than a data pattern boundary value, and the data pattern boundary value may be a boundary value of the number of high logics of the plurality of bits included in each of the first data groups so as to input low logic to the DM flag in the generating of the DM flag, regardless of single error occurrence of the plurality of bits included in each of the first data groups.

The method may further include: not performing the write operation on a fourth data group corresponding to the DM flag bit of high logic; and performing the write operation on the fourth data group corresponding to the DM flag bit of low logic.

The masking value may be 6, the data masking pattern boundary value may be 7, and the data pattern boundary value may be 4.

In an embodiment, a memory system includes: an ECC unit suitable for generating a second data error flag and a second DBI error flag based on second data, a second DBI flag, and a second parity, which are provided through a channel, and generating error-corrected third data and an error-corrected third DBI flag based on the second data error flag and the second DBI error flag; a DBI unit suitable for generating fourth data by determining whether a plurality of third data bits respectively corresponding to a plurality of DBI flag bits substituting the third DBI flag are inverted, based on the third data and the third DBI flag; and a DM unit suitable for generating a DM flag indicating whether a write operation is performed on a plurality of fourth data bits constituting the fourth data, based on the second data.

The DM unit may include a first DM sub unit and a second DM sub unit, the second data may include a plurality of second data groups, and the first DM sub unit may generate: a first pre-DM flag indicating whether the number of high logics of a plurality of bits included in each of the second data groups is at a boundary of a masking value; and a second pre-DM flag indicating whether the number of high logics of the plurality of bits included in each of the second data groups is equal to or greater than the masking value.

The second DM sub unit may generate the DM flag bit based on the first pre-DM flag, the second pre-DM flag, the second data, and the second data error flag.

The second DM sub unit may generate: the DM flag bit by determining whether the second pre-DM flag is corrected, based on the second data and the second data error flag, when the first pre-DM flag is high logic; and the DM flag bit having the same logic as that of the second pre-DM flag when the first pre-DM flag is low logic.

When the first pre-DM flag is high logic, the second DM sub unit may generate the DM flag bit having the same logic as that of the second pre-DM flag if an error does not exist in the plurality of bits constituting the second data group corresponding to the first pre-DM flag.

When the first pre-DM flag is high logic and the second pre-DM flag is low logic, the second DM sub unit may generate the DM flag bit of low logic if a bit in which an error occurs among the plurality of bits included in the second data group is high logic.

When the first pre-DM flag is high logic and the second pre-DM flag is low logic, the second DM sub unit may generate the DM flag bit of high logic if a bit in which an error occurs among the plurality of bits included in the second data group is low logic.

When the first pre-DM flag is high logic and the second pre-DM flag is high logic, the second DM sub unit may generate the DM flag bit of low logic if a bit in which an error occurs among the plurality of bits included in the second data group is high logic.

When the first pre-DM flag is high logic and the second pre-DM flag is high logic, the second DM sub unit may generate the DM flag bit of high logic if a bit in which an error occurs among the plurality of bits included in the second data group is low logic.

The fourth data may include a plurality of fourth data groups, the fourth data group corresponding to the DM flag bit of high logic may be a data group on which the write operation is not performed, and the fourth data group corresponding to the DM flag bit of low logic may be a data group on which the write operation is performed.

In an embodiment, a method of operating a memory system includes: generating a second data error flag and a second DBI error flag based on second data, a second DBI flag, and a second parity, which are provided through a channel, and generating error-corrected third data and an error-corrected third DBI flag based on the second data error flag and the second DBI error flag; generating fourth data by determining whether a plurality of third data bits respectively corresponding to a plurality of DBI flag bits constituting the third DBT flag are inverted, based on the third data and the third DBI flag; and generating a DM flag indicating whether a write operation is performed on a plurality of fourth data bits constituting the fourth data, based on the second data.

The generating of the DM flag may include a first DM sub process and a second DM sub process, the second data may include a plurality of second data groups, and the first DM sub process may include generating: a first pre-DM flag indicating whether the number of high logics of a plurality of bits included in each of the second data groups is at a boundary of a masking value; and a second pre-DM flag indicating whether the number of high logics of the plurality of bits included in each of the second data groups is equal to or greater than the masking value.

The second DM sub process may include generating the DM flag bit based on the first pre-DM flag, the second pre-DM flag, the second data, and the second data error flag.

The second DM sub process may include: generating the DM flag bit by determining whether the second pre-DM flag is corrected, based on the second data and the second data error flag, when the first pre-DM flag is high logic; and generating the DM flag bit having the same logic as that of the second pre-DM flag when the first pre-DM flag is low logic.

When the first pre-DM flag is high logic, the second DM sub process may include generating the DM flag bit having the same logic as that of the second pre-DM flag if an error does not exist in the plurality of bits constituting the second data group corresponding to the first pre-DM flag.

When the first pre-DM flag is high logic and the second pre-DM flag is low logic, the second DM sub process may include generating the DM flag bit of low logic if a bit in which an error occurs among the plurality of bits included in the second data group is high logic.

When the first pre-DM flag is high logic and the second pre-DM flag is low logic, the second DM sub process may include generating the DM flag bit of high logic if a bit in which an error occurs among the plurality of bits included in the second data group is low logic.

When the first pre-DM flag is high logic and the second pre-DM flag is high logic, the second DM sub process may include generating the DM flag bit of low logic if a bit in which an error occurs among the plurality of bits included in the second data group is high logic.

When the first pre-DM flag is high logic and the second pre-DM flag is high logic, the second DM sub process may include generating the DM flag bit of high logic if a bit in which an error occurs among the plurality of bits included in the second data group is low logic.

The fourth data may include a plurality of fourth data groups, and the method may further include: not performing the write operation on the fourth data group corresponding to the DM flag bit of high logic; and performing the write operation on the fourth data group corresponding to the DM flag bit of low logic.

In an embodiment, a memory system includes: a sub ECC unit suitable for generating a third sub DBT flag by correcting an error of a second sub DBI flag, based on a second sub parity provided through a channel; a sub DBI unit suitable for generating a third DBI flag and a third flag by determining whether a second DBI flag and a second parity are inverted, based on the third sub DBI flag; an ECC unit suitable for generating third data and a fourth DBI flag by correcting errors of second data and the third DBI flag, based on the third parity; a DBI unit suitable for generating fourth data by determining whether the third data is inverted, based on the fourth DBI flag; and a DM unit suitable for generating a DM flag indicating whether a write operation is performed on a plurality of fourth data bits constituting the fourth data, based on the second data.

The memory system may receive the second sub DBI flag through the same channel as a channel through which the second parity is transmitted.

The memory system may receive the second sub parity through the same channel as a channel through which the second parity is transmitted.

The DBI unit and the sub DBI unit may be operated by one of a DBI DC scheme and a DBI AC scheme.

In an embodiment, a method of operating a memory system includes: generating a third sub DBI flag by correcting an error of a second sub DBI flag, based on a second sub parity provided through a channel; generating a third DBI flag and a third flag by determining whether a second DBI flag and a second parity are inverted, based on the third sub DBI flag; generating third data and a fourth DBI flag by correcting errors of second data and the third DBI flag, based on the third parity; generating fourth data by determining whether the third data is inverted, based on the fourth DBI flag; and generating a DM flag indicating whether a write operation is performed on a plurality of fourth data bits constituting the fourth data, based on the second data.

The method may further include receiving the second sub DBI flag through the same channel as a channel through which the second parity is transmitted.

The method may further include receiving the second sub parity through the same channel as a channel through which the second parity is transmitted.

The generating of the third DBI flag and the third parity and the generating of the fourth data may be performed by one of a DBI DC scheme and a DBI AC scheme.

In an embodiment, a memory system includes: an ECC unit suitable for generating a second data error flag and a second DBI error flag, which are respectively error information about second data and a second DBI flag provided through a channel, based on a second parity provided through a channel; a DBI unit suitable for generating third data, to which results of both an error correction operation and a DBI operation on the second data are reflected, based on the second DBI flag, the second data error flag, and the second DBI error flag; and a DM unit suitable for generating a DM flag indicating whether a write operation is performed on a plurality of third data bits constituting the third data, based on the second data.

The DBI unit may include: an inversion calculator suitable for generating a second data final inversion flag, which is final inversion information about the second data, through the second DBI flag, the second data error flag, and the second DBI error flag; and an inversion unit suitable for generating third data by inverting the second data, based on the second data inversion flag.

The second data error flag may include a plurality of second data error flag groups, the second DBI flag may include a plurality of second DBI flag bits, the second DBI error flag may include a plurality of second DBI error flag bits, and the inversion calculator may generate the second data final inversion flag by performing an XOR operation on a second data error flag bit included in the second data error flag group, a second DBI flag bit corresponding to a second data error flag group including the second data error flag bit, and the second DBI error flag bit corresponding to the second data error flag group including the second data error flag bit.

The second data may include a plurality of second data bits, the second data final inversion flag may include a plurality of second data final inversion flag bits, the third data may include a plurality of third data bits, and when the second data final inversion flag bit is high logic, the inversion unit may generate a third data bit by inverting the logic of the second data bit corresponding to the second data final inversion flag bit.

When the second data final inversion flag bit is low logic, the inversion unit may generate a third data bit having the same logic as that of the second data bit corresponding to the second data final inversion flag bit.

The ECC unit may include an error flag generator, and the error flag generator may generate a second data error flag and a second DBI error flag, which are respectively error information about the second data and the second DBI flag, based on the second parity according to an SECDED scheme.

In an embodiment, a method of operating a memory system includes: generating a second data error flag and a second DBI error flag, which are respectively error information about second data and a second DBI flag provided through a channel, based on a second parity provided through a channel; generating third data, to which results of both an error correction operation and a DBI operation on the second data are reflected, based on the second DBI flag, the second data error flag, and the second DBI error flag; and generating a DM flag indicating whether a write operation is performed on a plurality of third data bits constituting the third data, based on the second data.

The generating of the third data may include: a first sub process of generating a second data final inversion flag, which is final inversion information about the second data, through the second DBI flag, the second data error flag, and the second DBI error flag; and a second sub process of generating third data by inverting the second data, based on the second data inversion flag.

The second data error flag may include a plurality of second data error flag groups, the second DBI flag may include a plurality of second DBT flag bits, the second DBI error flag may include a plurality of second DBI error flag bits, and the first sub process may include generating the second data final inversion flag by performing an XOR operation on a second data error flag bit included in the second data error flag group, a second DBI flag bit corresponding to the second data error flag group including the second data error flag bit, and the second DBI error flag bit corresponding to the second data error flag is group including the second data error flag bit.

The second data may include a plurality of second data bits, the second data final inversion flag may include a plurality of second data final inversion flag bits, the third data may include a plurality of third data bits, and when the second data final inversion flag bit is high logic, the second sub process may include generating a third data bit by inverting the logic of the second data bit corresponding to the second data final inversion flag bit.

The second data final inversion flag bit may be low logic, and the second sub process may include generating a third data bit having the same logic as that of the second data bit corresponding to the second data final inversion flag bit.

The generating of the second data error flag and the second DBI error flag may include generating a second data error flag and a second DBI error flag, which are respectively error information about the second data and the second DBI flag, based on the second parity according to an SECDED scheme.

DETAILED DESCRIPTION

Figure 1:
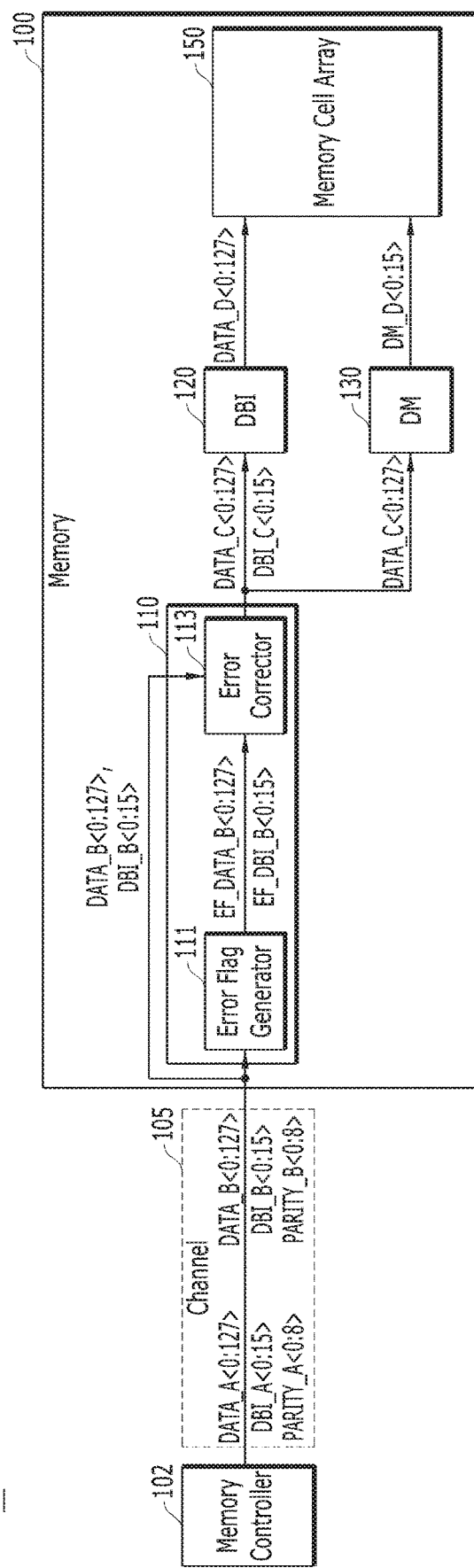
FIG. 1 is a schematic diagram of a conventional memory system.

Various embodiments will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

Hereinafter, embodiments will be described in more detail with reference to the accompanying drawings.

FIG. 1 illustrates a memory system 10 including an ECC unit 110, a DBI unit 120, and a DM unit 130.

A memory controller 102 may provide various signals for controlling a memory 100 through a channel 105. For example, the various signals may include a command/address signal CMD/ADD, a clock signal CLK, and a data signal DQ.

The memory controller 102 transmits data to the memory 100 through the channel 105. The memory 100 includes the ECC unit 110, the DBI unit 120, the DM unit 130, and a memory cell array 150.

The memory cell array 150 may include a volatile memory such as dynamic random access memory (DRAM) and static random access memory (SRAM).

The memory 100 may include a write driver (not illustrated).

As described below, the write driver may perform a write operation on some data groups constituting data and may not perform the write operation on the other data groups, based on a masking flag.

The memory controller 102 transmits first data DATA_A<0:127>, a first DBI flag DBI_A<0:15> that is inversion information about the first data DATA_A<0:127>, and a first parity PARITY_A<0:8> that is an error correction parity of the first data DATA_A<0:127> and the first DBI flag DBI_A<0:15>.

The first data DATA_A<0:127> is composed of zeroth to 127th bits, that is, a total of 128 bits. The number of bits of the first data DATA_A<0:127> is merely a set value for convenience of explanation, and the present invention is not limited to the number of bits of the first data DATA_A<0:127>.

The first DBI flag DBI_A<0:15> is composed of zeroth to fifteenth bits, that is, a total of 16 bits. The number of bits of the first DBI DBI_A<0:15> is merely a set value for convenience of explanation, and the present invention is not limited to the number of bits of the first DBI DBI_A<0:15>.

The first parity PARITY_A<0:8> is composed of zeroth to eighth bits, that is, a total of 9 bits. The number of bits of the first parity PARITY_A<0:8> is merely a set value for convenience of explanation, and the present invention is not limited to the number of bits of the first parity PARITY_A<0:8>.

TABLE 1

|  | DQ0 | DQ1 | DQ2 | DQ3 | DQ4 | DQ5 | DQ6 | DQ7 | DBI |
|---|---|---|---|---|---|---|---|---|---|
| BL0 | 0 | 16 | 32 | 48 | 64 | 80 | 96 | 112 | 0 |
| BL1 | 1 | 17 | 33 | 49 | 65 | 81 | 97 | 113 | 1 |
| BL2 | 2 | 18 | 34 | 50 | 66 | 82 | 98 | 114 | 2 |
| BL3 | 3 | 19 | 35 | 51 | 67 | 83 | 99 | 115 | 3 |
| BL4 | 4 | 20 | 36 | 52 | 68 | 84 | 100 | 116 | 4 |
| BL5 | 5 | 21 | 37 | 53 | 69 | 85 | 101 | 117 | 5 |
| BL6 | 6 | 22 | 38 | 54 | 70 | 86 | 102 | 118 | 6 |
| BL7 | 7 | 23 | 39 | 55 | 71 | 87 | 103 | 119 | 7 |
| BL8 | 8 | 24 | 40 | 56 | 72 | 88 | 104 | 120 | 8 |
| BL9 | 9 | 25 | 41 | 57 | 73 | 89 | 105 | 121 | 9 |
| BL10 | 10 | 26 | 42 | 58 | 74 | 90 | 106 | 122 | 10 |
| BL11 | 11 | 27 | 43 | 59 | 75 | 91 | 107 | 123 | 11 |
| BL12 | 12 | 28 | 44 | 60 | 76 | 92 | 108 | 124 | 12 |
| BL13 | 13 | 29 | 45 | 61 | 77 | 93 | 109 | 125 | 13 |
| BL14 | 14 | 30 | 46 | 62 | 78 | 94 | 110 | 126 | 14 |
| BL15 | 15 | 31 | 47 | 63 | 79 | 95 | 111 | 127 | 15 |

Table 1 shows that the 128 bits constituting the first data DATA_A<0:127> are configured with 16 groups BL0 to BL15. Zeroth to fifteenth bits, that is, a total of 16 bits, in the first data DATA_A<0:127> correspond to DQ0. Similarly, 112th to 127th bits, that is, a total of 16 bits, in the first data DATA_A<0:127> correspond to DQ7. It should be noted that the method of dividing data groups as shown in Table 1 is arbitrarily set for convenience of explanation.

A total of 16 bits of the first DBI flag DBI_A<0:15> correspond to 16 groups BL0 to BL15 of the first data DATA_A<0:127>, respectively. DBI_A0, which is the zeroth bit of the first DBI flag DBI_A<0:15>, represents inversion information about bits corresponding to the BLU group of the first data DATA_A<0:127>, that is, DATA_A0, DATA_A16, DATA_A32, DATA_A64, DATA_A80, DATA_A96, and DATA_A112. Similarly, DBI_A15, which is the fifteenth bit of the first DBI flag DBI_A<0:15>, represents inversion information about bits corresponding to the BL15 group of the first data DATA_A<0:127>, that is, DATA_A15, DATA_A31, DATA_A47, DATA_A63, DATA_A79, DATA_A95, DATA_A111, and DATA_A127.

Each bit of the first DBI flag DBI_A<0:15> is determined according to the number of logics of bits corresponding to each group of the first data DATA_A<0:127> corresponding to each bit of the first DBI flag DBI_A<0:15>. For example, when bits of high logic among the bits corresponding to the BL0 group of the first data DATA_A<0:127>, that is, DATA_A0, DATA_A16, DATA_A32, DATA_A48, DATA_A64, DATA_A80, DATA_A96, and DATA_A112, are five or more, DBI_A0 has high logic, which means that the inversion operation has been performed on the bits corresponding to the BL0 group of the first data DATA_A<0:127>. On the contrary, when bits of high logic among the bits corresponding to the BL0 group of the first data DATA_A<0:127>, that is, DATA_A0, DATA_A16, DATA_A48, DATA_A64, DATA_A80, DATA_A96, and DATA_A112, are less than five, DBI_A0 has low logic, which means that the inversion operation has not been performed on the bits corresponding to the BL0 group of the first data DATA_A<0:127>.

The first data DATA_A<0:127>, the first DBI flag DBI_A<0:15>, and the first parity PARITY_A<0:8>, which pass through the channel, are received by the memory 100 in the form of second data DATA_B<0:127>, a second DBI flag DBI_B<0:15>, and a second parity PARITY_B<0:8>, respectively.

The ECC unit 110 receives the second data DATA_B<0:127>, the second DBI flag DBI_B<0:15>, and the second parity PARITY_B<0:8>, and corrects the second data DATA_B<0:127> and the second DBI flag DBI_B<0:15> through the second parity PARITY_B<0:8>. The method by which the ECC unit 110 corrects the second data DATA_B<0:127> and the second DBI flag DBI_B<0:15> may be a scheme defined in hamming code. The method by which the ECC unit 110 corrects the error may include other various error correction schemes.

The ECC unit 110 corrects the second data DATA_B<0:127> and the second DBI flag DBI_B<0:15> and outputs third data DATA_C<0:127> and a third DBI flag DBI_C<0:15>.

Specifically, the ECC unit 110 includes an error flag generator 111 and an error corrector 113.

The error flag generator 111 generates a second data error flag EF_DATA_B<0:127> and a second DBI error flag EF_DBI_B<0:15> indicating error information of the second data DATA_B<0:127> and the second DBI flag DBI_B<0:15>, based on the second parity PARITY_B<0:8>. The method by which the error flag generator 111 generates the second data error flag EF_DATA_B<0:127> and the second DBI error flag EF_DBI_B<0:15> may be representatively performed according to a hamming code rule, or may be performed by various ECC schemes.

The error corrector 113 generates third data DATA_C<0:127> and a third DBI flag DBI_C<0:15> by correcting the second data DATA_B<0:127> and the second DBI flag DBI_B<0:15>, based on the second data DATA_B<0:127>, the second DBI flag DBI_B<0:15>, the second data error flag EF_DATA_B<0:127>, and the second DBI error flag EF_DBI_B<0:15>.

As described with reference to Table 1, a total of 16 bits of the third DBI flag DBI_C<0:15> correspond to 16 groups BL0 to BL15 of the third data DATA_C<0:127>, respectively. DBI_C0, which is the zeroth bit of the third DBI flag DBI_C<0:15>, represents inversion information about the bits corresponding to the BL0 group of the third data DATA_C<0:127>, that is, DATA_C0, DATA_C16, DATA_C32, DATA_C48, DATA_C64, DATA_C80, DATA_C96, and DATA_C112. Similarly, DBI_C15, which is the fifteenth bit of the third DBI flag DBI_C<0:15>, represents inversion information about bits corresponding to the BL15 group of the third data DATA_C<0:127>, that is, DATA_C15, DATA_C31, DATA_C47, DATA_C63, DATA_C79, DATA_C95, DATA_C111, and DATA_C127.

The DBI unit 120 generates fourth data DATA_D<0:127> by determining inversion or non-inversion of the respective groups BL0 to BL15 of the third data DATA_C<0:127> corresponding to the plurality of DBI flag bits constituting the third DBI flag DBI_C<0:15>, For example, when DBI_C0, which is the zeroth bit of the third DBI flag DBI_C<0:15>, has high logic, the DBI unit 120 outputs DATA_D_BL0 obtained by inverting bits corresponding to DATA_C_BL0. In addition, when DBI_C0, which is the zeroth bit of the third DBI flag DBI_C<0:15>, has low logic, the DBI unit 120 outputs DATA_D_BL0 obtained by not inverting bits corresponding to DATA_C_BL0.

The DM unit 130 generates a DM flag DM_D<0:15> by determining masking or non-masking of the respective groups BL0 to BL15 of the third data DATA_C<0:127>.

TABLE 2

|  | DQ0 | DQ1 | DQ2 | DQ3 | DQ4 | DQ5 | DQ6 | DQ7 | DM_D |
|---|---|---|---|---|---|---|---|---|---|
| BL0 | 0 | 16 | 32 | 48 | 64 | 80 | 96 | 112 | 0 |
| BL1 | 1 | 17 | 33 | 49 | 65 | 81 | 97 | 113 | 1 |
| BL2 | 2 | 18 | 34 | 50 | 66 | 82 | 98 | 114 | 2 |
| BL3 | 3 | 19 | 35 | 51 | 67 | 83 | 99 | 115 | 3 |
| BL4 | 4 | 20 | 36 | 52 | 68 | 84 | 100 | 116 | 4 |
| BL5 | 5 | 21 | 37 | 53 | 69 | 85 | 101 | 117 | 5 |
| BL6 | 6 | 22 | 38 | 54 | 70 | 86 | 102 | 118 | 6 |
| BL7 | 7 | 23 | 39 | 55 | 71 | 87 | 103 | 119 | 7 |
| BL8 | 8 | 24 | 40 | 56 | 72 | 88 | 104 | 120 | 8 |
| BL9 | 9 | 25 | 41 | 57 | 73 | 89 | 105 | 121 | 9 |
| BL10 | 10 | 26 | 42 | 58 | 74 | 90 | 106 | 122 | 10 |
| BL11 | 11 | 27 | 43 | 59 | 75 | 91 | 107 | 123 | 11 |
| BL12 | 12 | 28 | 44 | 60 | 76 | 92 | 108 | 124 | 12 |
| BL13 | 13 | 29 | 45 | 61 | 77 | 93 | 109 | 125 | 13 |
| BL14 | 14 | 30 | 46 | 62 | 78 | 94 | 110 | 126 | 14 |
| BL15 | 15 | 31 | 47 | 63 | 79 | 95 | 111 | 127 | 15 |

Table 2 shows the relationship between the third data DATA_C<0:127> and the DM flag DM_D<0:15> for generating the fourth data DATA_D<0:127> and the relationship between the fourth data DATA_D<0:127> corresponding to the DM flag DM_D<0:15> and the DM flag DM_D<0:15>.

The DM unit 130 generates a DM flag indicating whether a write operation is performed on a plurality of data bits constituting the fourth data based on the third data DATA_C<0:127>.

The write driver (not illustrated) may perform a write operation on the memory cell array 150 with respect to the fourth data bits based on the DM flag.

A total of 16 bits of the DM flag DM_D<0:15> are generated corresponding to 16 groups BL0 to BL15 of the third data DATA_C<0:127>, respectively. DM_D0, which is the zeroth bit of the DM flag DM_D<0:15>, is generated from the bits corresponding to the BL0 group of the third data DATA_C<0:127>, that is, DATA_C0, DATA_C16, DATA_C32, DATA_C48, DATA_C64, DATA_C80, DATA_C96, and DATA_C112. Similarly, DM_D15, which is the fifteenth bit of the DM flag DM_D<0:15>, is generated from the bits corresponding to the BL15 group of the third data DATA_C<0:127>, that is, DATA_C15, DATA_C31, DATA_C47, DATA_C63, DATA_C79, DATA_C95, DATA_C111, and DATA_C127.

A total of 16 bits of the DM flag DM_D<0:15> correspond to groups BL0 to BL15 of the fourth data DATA_D<0:127>, respectively. DM_D0, which is the zeroth bit of the DM flag DM_D<0:15>, represents masking information about the bits corresponding to the BL0 group of the fourth data DATA_D<0:127>, that is, DATA_D0, DATA_D16, DATA_D32, DATA_D48, DATA_D64, DATA_D80, DATA_D96, and DATA_D112. Similarly, DM_D15, which is the fifteenth bit of the DM flag DM_D<0:15>, represents masking information about the bits corresponding to the BL15 group of the fourth data DATA_D<0:127>, that is, DATA_D15, DATA_D31, DATA_D47, DATA_D63, DATA_D79, DATA_D95, DATA_D111, and DATA_D127.

TABLE 3

| Number of 1s of DATA_C_BL#<2:7> | 0 to 4 | 5 or 6 |
|---|---|---|
| Logic of Each Bit of DM Flag (DM_D<0:15>) | 0 | 1 |

Table 3 shows a rule by which the DM unit 130 generates the DM flag DM_D<0:15> in the operation of the conventional DM unit 130.

The DM unit 130 determines logic of each bit of the DM flag DM_D<0:15> according to the number of is of DATA_C_BL#<2:7> which are the third data DATA_C<0:127> bits corresponding to DQ2 to DQ7 for each BL group of the third data DATA_C<0:127>.

When the number of 1s of DATA_C_BL#<2:7> is 0 to 4, the DM unit 130 inputs low logic to the corresponding bits of the DM flag DM_D<0:15>.

When the number of 1s of DATA_C_BL#<2:7> is 5 or 6, the DM unit 130 inputs high logic to the corresponding bits of the DM flag DM_D<0:15>.

TABLE 4

| DATA_C_BL0<2:7> | DQ0 | DQ1 | DQ2 | DQ3 | DQ4 | DQ5 | DQ6 | DQ7 | DM_D0 |
|---|---|---|---|---|---|---|---|---|---|
| BL0 | 0 | 16 | 32 | 48 | 64 | 80 | 96 | 112 | 0 |
| | <X> | <X> | <1> | <1> | <1> | <1> | <1> | <0> | <1> |

Table 4 shows the bits of the third data DATA_C<0:127> corresponding to DATA_C_BL0<2:7> and the zeroth DM flag DM_D0 with reference to Tables 2 and 3. When the conventional DM unit 130 follows the rule for generating the DM flag DM_D<0:15>, the zeroth DM flag DM_D0 may be determined according to logic of bits corresponding to DATA_C_BL0<2:7>, except for the zeroth and first bits, in DATA_C_BL0<0:7> corresponding to BL0.

According to the example presented in Table 4, bits having high logic among DATA_C32, DATA_C48, DATA_C64, DATA_C96, and DATA_C112, which are bits corresponding to DATA_C_BL0<2:7>, are a total of five bits DATA_C32, DATA_C48, DATA_C64, DATA_C80, and DATA_C96. Therefore, the zeroth DM flag DM_D0 has high logic.

Table 5 shows the bits of the third data DATA_C<0:127> corresponding to DATA_C_BL0<2:7> and the zeroth DM flag DM_D0 with reference to Tables 2 and 3. When the conventional DM unit 130 follows the rule for generating the DM flag DM_D<0:15>, the zeroth DM flag DM_D0 may be determined according to logic of bits corresponding to DATA_C_BL0<2:7>, except for the zeroth and first bits, in DATA_C_BL0<0:7> corresponding to BL0.

According to the example presented in Table 5, bits having high logic among DATA_C32, DATA_C48, DATA_C64, DATA_C96, and DATA_C112, which are bits corresponding to DATA_C_BL0<2:7>, are a total of four bits DATA_C32, DATA_C48, DATA_C64, and DATA_C80. Therefore, the zeroth DM flag DM_D0 has low logic.

TABLE 6

| Number of 1s of DATA_3_BL#<2:7> | 0 to 3 | 4 | 5 | 6 |
|---|---|---|---|---|
| Logic of DM Flag Bit Calculated by DATA_B_BL#<2:7> | 0 | 0 | 1 | 1 |
| Logic of Bit in Which Error Occurs | X | 1 0 | 1 0 | X |
| Logic of DM Flag Bit Calculated by DATA_C_BL#<2:7> | 0 | 0 1 | 0 1 | 1 |

Table 6 shows the comparison between logic of the DM flag bit calculated by DATA_B_BL#<2:7> corresponding to each BL of the second data DATA_B<0:127>, which is data before the error is corrected, and logic of the DM flag bit calculated by DATA_C_BL#<2:7> corresponding to each BL of the third data DATA_C<0:127>, which is data after the error is corrected.

When the number of high logics of the bits corresponding to DATA_B_BL#<2:7> is 0 to 3, the logic of the DM flag bit calculated by DATA_B_BL#<2:7> has low logic. At this time, even when single error occurs in the bits corresponding to DATA_B_BL#<2:7>, the number of high logics for the DM unit 130 to generate the DM flag DM_D<0:15> is 5, and thus the logic of the DM flag bit calculated by DATA_C_BL#<2:7> also essentially has low logic. Specifically, when the number of high logics of the bits corresponding to DATA_B_BL#<2:7> is 3, even if single error occurs in the bit having low logic among the bits corresponding to DATA_B_BL#<2:7> and thus the number of high logics of the bits corresponding to DATA_B_BL#<2:7> becomes 4, the number of high logics is still less than 5. Therefore, the logic of the DM flag bit has low logic.

When the number of high logics of the bits corresponding to DATA_B_BL#<2:7> is 4, the logic of the DM flag bit calculated by DATA_B_BL#<2:7> has low logic. At this time, when single error occurs in the bits corresponding to DATA_B_BL#<2:7>, the logic of the DM flag bit calculated by DATA_C_BL#<2:7> may have high logic or low logic.

TABLE 5

| DATA_C_BL0<2:7> | DQ0 | DQ1 | DQ2 | DQ3 | DQ4 | DQ5 | DQ6 | DQ7 | DM_D0 |
|---|---|---|---|---|---|---|---|---|---|
| BL0 | 0 | 16 | 32 | 48 | 64 | 80 | 96 | 112 | 0 |
| | <X> | <X> | <1> | <1> | <1> | <1> | <0> | <0> | <0> |

Specifically, when the number of high logics of the bits corresponding to DATA_B_BL#<2:7> is 4, if the logic of the bit in which single error occurs among the bits corresponding to DATA_B_BL#<2:7> is high logic, the number of high logics of the bits corresponding to DATA_B_BL#<2:7> is 3. Therefore, the logic of the DM flag bit still has low logic. On the other hand, when the number of high logics of the bits corresponding to DATA_B_BL#<2:7> is 4, if the logic of the bit in which single error occurs among the bits corresponding to DATA_B_BL#<2:7> is low logic, the number of high logics of the bits corresponding to DATA_B_BL#<2:7> is 5. Therefore, the logic of the DM flag bit has high logic. That is, when the number of high logics of the bits corresponding to DATA_B_BL#<2:7> is 4, the logic of the DM flag bit may be changed according to the presence or absence of single error of DATA_B_BL#<2:7> and the correction result thereof.

When the number of high logics of the bits corresponding to DATA_B_BL#<2:7> is 5, the logic of the DM flag bit calculated by DATA_B_BL#<2:7> has high logic. At this time, when single error occurs in the bits corresponding to DATA_B_BL#<2:7>, the logic of the DM flag bit calculated by DATA_C_BL#<2:7> may have high logic or low logic. Specifically, when the number of high logics of the bits corresponding to DATA_B_BL#<2:7> is 5, if the logic of the bit in which single error occurs among the bits corresponding to DATA_B_BL#<2:7> is high logic, the number of high logics of the bits corresponding to DATA_B_BL#<2:7> is 4. Therefore, the logic of the DM flag bit is changed to low logic. On the other hand, when the number of high logics of the bits corresponding to DATA_B_BL#<2:7> is 5, if the logic of the bit in which single error occurs among the bits corresponding to DATA_B_BL#<2:7> is low logic, the number of high logics of the bits corresponding to DATA_B_BL#<2:7> is 6. Therefore, the logic of the DM flag bit still has high logic. That is, when the number of high logics of the bits corresponding to DATA_B_BL#<2:7> is 5, the logic of the DM flag bit may be changed according to the presence or absence of single error of DATA and the correction result thereof.

When the number of high logics of the bits corresponding to DATA_B_BL#<2:7> is 6, the logic of the DM flag bit calculated by DATA_B_BL#<2:7> has high logic. At this time, even when single error occurs in the bits corresponding to DATA_B_BL#<2:7>, the number of high logics for the DM unit 130 to generate the DM flag DM_D<0:15> is 5, and thus the logic of the DM flag bit calculated by DATA_C_BL#<2:7> also essentially has high logic. Specifically, when the number of high logics of the bits corresponding to DATA_B_BL#<2:7> is 6, even if single error occurs in the bit having high logic among the bits corresponding to DATA_B_BL#<2:7> and thus the number of high logics of the bits corresponding to DATA_B_BL#<2:7> becomes 5, the number of high logics is 5 or more. Therefore, the logic of the DM flag bit has high logic.

As described with reference to FIG. 1 and Tables 1 to 6, according to the operating method of the conventional DM unit 130, the DM rule for determining the DM flag DM_D<0:15> corresponds to whether the number of high logics of the data bits is 5 or more. According to such a DM rule, there is a possibility that the logic of the DM flag DM_D<0:15> will be changed according to whether single error occurs in the data bits. Therefore, in order to remove the possibility that the logic of the DM flag DrvI_D<0:15> will be changed, after the ECC unit 110 corrects the second data DATA_B<0:127> to generate the third data DATA_C<0:127>, the DM unit 130 must generate the DM flag DM_D<0:15> through the third data DATA_C<0:127>.

That is, there has been a limitation in that the conventional DM unit 130 cannot operate in parallel to the ECC unit 130, and the DM unit 130 must operate after the ECC unit 130 operates. Due to such a limitation, there is a problem that the entire operating time of the ECC unit 110, the DBI unit 120, the DM unit 130, which are present in the memory 100, increases.

Figure 2:
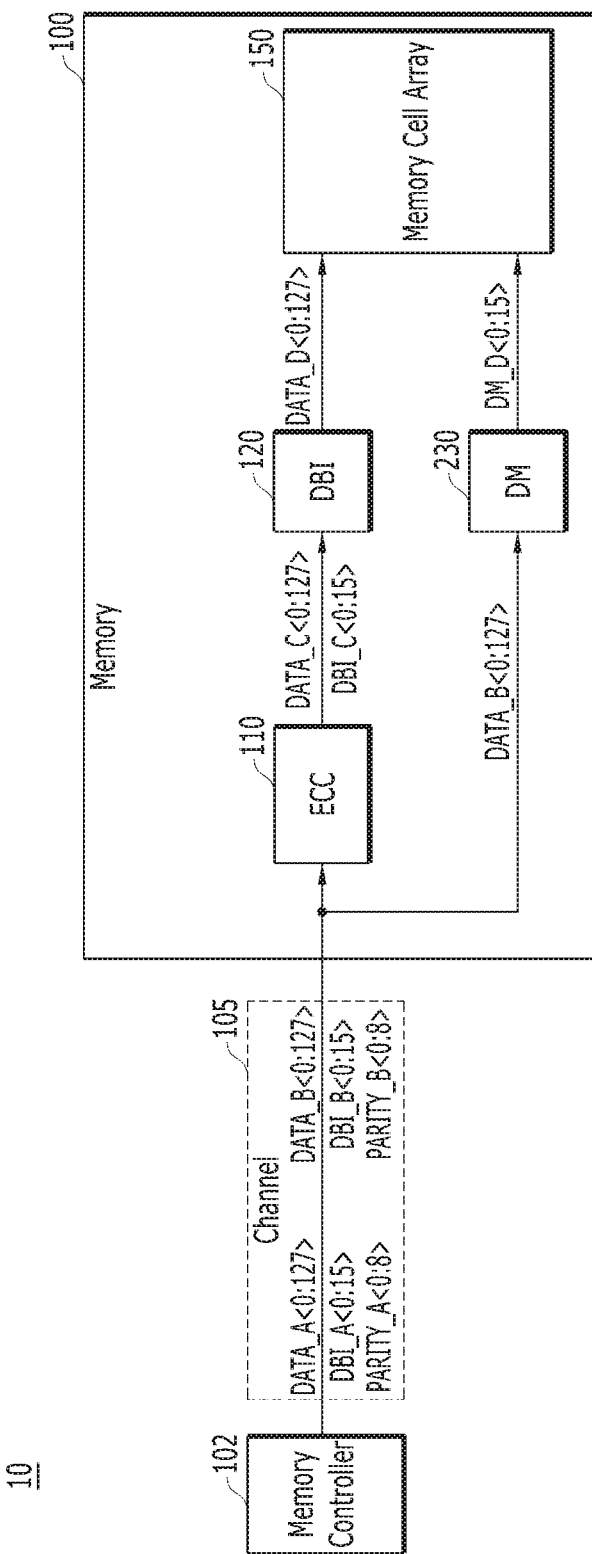
FIG. 2 is a schematic diagram of a memory system including a DM unit in accordance with an embodiment.

FIG. 2 illustrates a memory system 10 including an ECC unit 110, a DBI unit 120, and a DM unit 230.

A memory controller 102 may transmit data to a memory 100 through a channel 105. The memory 100 may include the ECC unit 110, the DBI unit 120, and the DM unit 230.

The memory controller 102 may transmit first data DATA_A<0:127>, a first DBI flag DBI_A<0:15> that is inversion information about the first data DATA_A<0:127>, and a first parity PARITY_A<0:8> that is an error correction parity of the first data DATA_A<0:127> and the first DBI flag DBI_A<0:15>.

The first data DATA_A<0:127> may be composed of zeroth to 127th bits, that is, a total of 128 bits. The number of bits of the first data DATA_A<0:127> is merely a set value for convenience of explanation, and the present invention is not limited to the number of bits of the first data DATA_A<0:127>.

The first DBI flag DBI_A<0:15> may be composed of zeroth to 15th bits, that is, a total of 16 bits. The number of bits of the first DBI DBI_A<0:15> is merely a set value for convenience of explanation, and the present invention is not limited to the number of bits of the first DBI DBI_A<0:15>.

The first parity PARITY_A<0:8> may be composed of zeroth to eighth bits, that is, a total of 9 bits. The number of bits of the first parity PARITY_A<0:8> is merely a set value for convenience of explanation, and the present invention is not limited to the number of bits of the first parity PARITY_A<0:8>.

The ECC unit 110 and the DBI unit 120 may operate in the same manner as the above-described principle.

The DM unit 230 in accordance with the present embodiment may operate independently of the ECC unit 110 through a new DM rule.

TABLE 7

| Number of High Logics of First Data Group DATA_A_BL#<0:7> | Number of High Logics of Second Data Group DATA_B_BL#<0:7> | Logic of DM Flag Bit DM_D# |
|---|---|---|
| 1 to 3 Data Pattern | — | 0 |
| 4 Data Pattern Boundary Value | 3 | 0 |
|  | 4 | 0 |
|  | 5 | 0 |
| 5 Not Used | 4 | 0 |
|  | 5 | 0 |
|  | 6 | 1 |
| 6 Not Used | 5 | 0 |
|  | 6 | 1 |
|  | 7 | 1 |
| 7 Data Masking Pattern Boundary Value | 6 | 1 |
|  | 7 | 1 |
|  | 8 | 1 |
| 8 Data Masking Pattern | — | 1 |

Table 7 is provided for describing the DM rule of the DM unit 230 in accordance with an embodiment.

In transmitting the first data DATA_A<0:127>, the memory controller 102 may transmit data bits DATA_A_BL#<0:7> corresponding to the BL groups of the first data DATA_A<0:127> according to the DM rule.

As a specific description of DATA_A_BL#<0:7> described herein, the first data group 0 DATA_A_BL0<0:7> may correspond to the first data DATA_A<0:127> bits corresponding to BL0 in the first data DATA_A<0:127>. Similarly, the first data group 15 DATA_A_BL15<0:7> may correspond to the first data DATA_A<0:127> bits corresponding to BL15 in the first data DATA_A<0:127>.

The DM rule presented herein may be a rule that can generate the DM flag DM_D<0:15>, regardless of whether the error of the second data DATA_B<0:127> input to the DM unit 230 is corrected. It should be noted that the DM rule, which is specifically described through the number presented herein, is merely a value arbitrarily set for convenience of explanation, and the present invention is not limited to the number presented herein.

In accordance with an embodiment, the DM unit 230 may generate the DM flag DM_D<0:15> by inputting high logic to the DM flag bit DM_D# corresponding to the second data group DATA_B_BL#<0:7> when the number of high logics of the second data group DATA_B_BL#<0:7> is equal to or greater than a masking value (6) and inputting low logic to the DM flag bit DM_D# corresponding to the second data group DATA_B_BL#<0:7> when the number of high logics of the second data group DATA_B_BL#<0:7> is less than the masking value (6).

For example, the DM unit 230 may input high logic to the zeroth DM flag bit DM_D0 when the number of high logics of the second data group 0 DATA_B_BL0<0:7> is equal to or greater than the masking value (6). In addition, the DM unit 230 may input low logic to the zeroth DM flag bit DM_D0 when the number of high logics of the second data group 0 DATA_B_BL0<0:7> is less than the masking value (6).

A data masking pattern boundary value, which is the number of high logics of the first data bits included in the first data group DATA_A_BL#<0:7> so that the memory controller 102 generates the DM flag for the purpose of data masking, may be determined to be 7 in accordance with an embodiment.

A data pattern boundary value, which is the number of high logics of the first data bits included in the first data group DATA_A_BIL#<0:7> so that the memory controller 102 transmits data, may be determined to be 4 in accordance with an embodiment.

That is, in accordance with the present embodiment, the masking value (6) may be a value less than the data masking pattern boundary value (7) and greater than the data pattern boundary value (4).

When the memory controller 102 transmits data, the memory controller 102 may transmit the first data group DATA_A_BL#<0:7> in which the number of high logics is equal to or less than the data pattern boundary value (4).

When the memory controller 102 transmits the first data group DATA_A_BL#<0:7> in which the number of high logics is 4 so as to transmit data, the number of high logics in the second data group DATA_B_BL#<0:7> input to the DM unit 230 may be 3 to 5 according to the occurrence of single error. Specifically, when an error occurs in the bit having high logic in the first data group DATA_A_BL#<0:7>, the number of bits having high logic in the second data group DATA_B_BL#<0:7> may be 3. In addition, when an error occurs in the bit having low logic in the first data group DATA_A_BL#<0:7>, the number of bits having high logic in the second data group DATA_B_BL#<0:7> may be 5. When an error does not occur in the first data group DATA_A_BL#<0:7>, the number of bits having high logic in the second data group DATA_B_BL#<0:7> may be 4.

Even when an error occurs in the bit having low logic in the first data group DATA_A_BL#<0:7> and thus the number of bits having high logic in the second data group DATA_B_BL#<0:7> is 5, 5 is still a value less than the masking value (6). Therefore, the DM unit 230 may input low logic to the corresponding DM flag bit DM_D#.

When the memory controller 102 intends to perform a data masking operation, the memory controller 102 may transmit the first data group DATA_A_BL#<0:7> in which the number of high logics is equal to or greater than the data masking pattern boundary value (7).

When the memory controller 102 transmits the first data group DATA_A_BL#<0:7> in which the number of high logics is 7 so as to perform the data masking operation, the number of high logics in the second data group DATA_B_BL#<0:7> input to the DM unit 230 may be 6 to 8 according to the occurrence of single error. Specifically, when an error occurs in the bit having high logic in the first data group DATA_A_BL#<0:7>, the number of bits having high logic in the second data group DATA_B_BL#<0:7> may be 6. In addition, when an error occurs in the bit having low logic in the first data group DATA_A_BL#<0:7>, the number of bits having high logic in the second data group DATA_B_BL#<0:7> may be 8. When an error does not occur in the first data group DATA_A_BL#<0:7>, the number of bits having high logic in the second data group DATA_B_BL#<0:7> may be 7.

Even when an error occurs in the bit having high logic in the first data group DATA_A_BL#<0:7> and thus the number of bits having high logic in the second data group DATA_B_BL#<0:7> is 6, 6 is still a value equal to or greater than the masking value (6). Therefore, the DM unit 230 may input high logic to the corresponding DM flag bit DM_D#.

The memory cell array 150 may not performa write operation on the fourth data group DATA_D_BL#<0:7> corresponding to the DM flag bit DM_D# of high logic. The memory cell array 150 may perform a write operation on the fourth data group DATA_D_BL#<0:7> corresponding to the DM flag bit DM_D# of low logic.

That is, according to the operation of the memory system including the DM unit 230 in accordance with the present embodiment, is since the DM unit 230 can operate regardless of whether single error occurs in the second data group DATA_B_BL#<0:7>, the DM unit 230 can operate independently of the ECC unit 110.

Specifically, the DM unit 230 may operate through the second data group DATA_B_BL#<0:7> that may have an error, instead of the third data group DATA_C_BL#<0:7> that is error-corrected data. That is, the DM unit 230 can operate independently of the ECC unit 110. As a result, the entire operating speed of the memory system may be improved.

Figure 3:
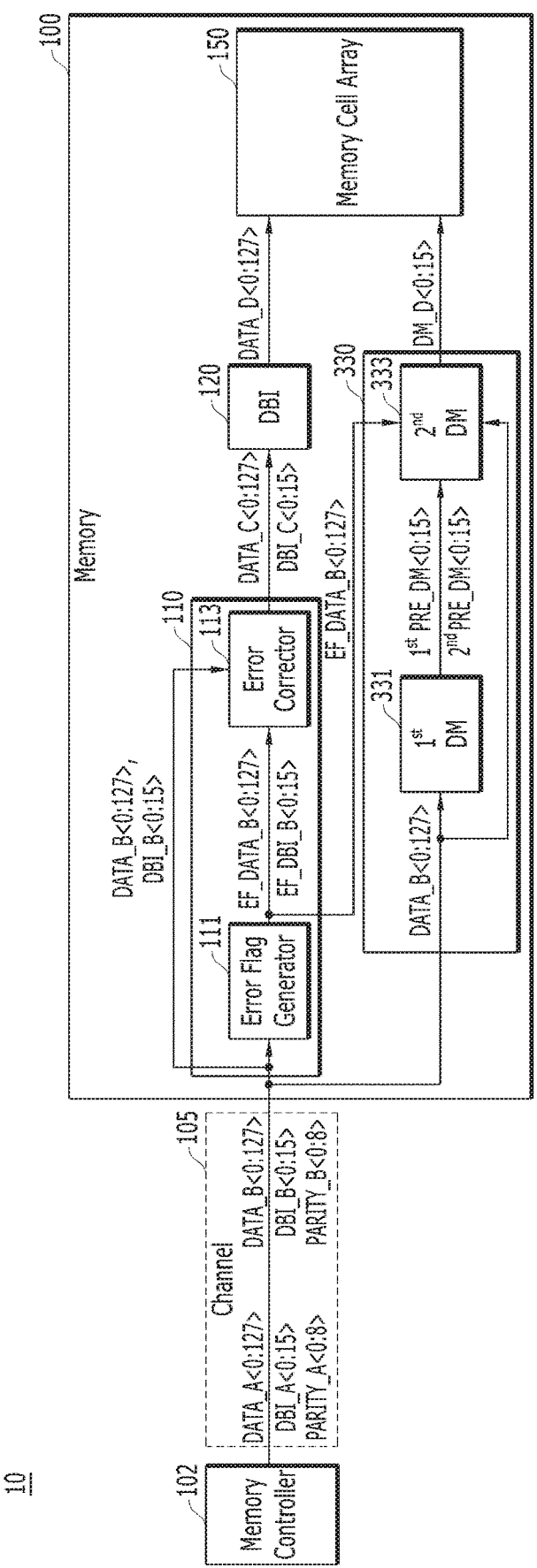
FIG. 3 is a schematic diagram of a memory system including a DM unit in accordance with another embodiment.

FIG. 3 illustrates a memory system 10 including an ECC unit 110, a DBI unit 120, and a DM unit 330.

The DM unit 330 may include a first DM sub unit (1$^{st}$ DM unit) 331 and a second DM sub unit (2$^{nd}$ DM unit) 333.

The first DM sub unit 331 may generate a first pre-DM flag 1$^{st}$ Pre_DM<0:15> and a second pre-DM flag 2$^{nd}$ Pre_DM<0:15>, based on second data DATA_B<0:127>.

The second DM sub unit 333 may generate the DM flag DM_D<0:15> by correcting the second pre-DM flag 2$^{nd}$ Pre_DM<0:15>, based on the first pre-DM flag $1^{st}$ Pre_DM<0:15>, the second data DATA_B<0:127>, and a second data error flag EF_DATA_B<0:127>.

The first pre-DM flag $1^{st}$ Pre_DM<0:15> may indicate whether the number of high logics of a plurality of bits included in a second data group DATA_B_BL#<2:7> corresponds to a boundary of a masking value.

The second pre-DM flag $2^{nd}$ Pre_DM<0:15> may indicate whether the number of high logics of the plurality of bits included in the second data group DATA_B_BL#<2:7> is equal to or greater than the masking value.

For convenience, the case where the number of the plurality of bits included in the second data group DATA_B_BL#<2:7> is 6, the second to seventh bits, has been described, but the present invention is not limited to the number of the plurality of bits included in the second data group DATA_B_BL#<2:7>. In addition, for convenience, the case where the masking value is 5 has been described, but the present invention is not limited to the masking value of "5".

TABLE 8

| Number of High Logics of Bits Included in Second Data Group (DATA_B_BL#<2:7>) | 0 t 3 | | 4 | 5 | 6 | |
|---|---|---|---|---|---|---|
| Logic of First Pre-DM Bit ($1^{st}$ PRE_DM#) | 0 | | 1 | 1 | 0 | |
| Logic of Second Pre-DM Bit ($2^{nd}$ PRE_DM#) | 0 | | 0 | 1 | 1 | |
| Logic of Bit in Which Error Occurs | X | 1 | 0 | 1 | 0 | X |
| Logic of DM Flag Bit (DM_D#) | 0 | 0 | 1 | 0 | 1 | 1 |

Table 8 shows the DM flag bit DM_D# generated according to the logic of the first pre-DM bit $1^{st}$ PRE_DM# and the logic of the second pre-DM bit $2^{nd}$ PRE_DM# generated according to the number of high logics of the plurality of bits included in the second data group DATA_B_BL#<2:7> and the logic of the bit in which an error occurs in the plurality of bits included in the second data group DATA_B_BL#<2:7>.

The first DM sub unit 331 may input high logic to the first pre-DM bit $1^{st}$ PRE_DM# when the number of high logics of the bits included in the second data group DATA_B_BL#<2:7> is 4 or 5.

The first DM sub unit 331 may input low logic to the first pre-DM bit $1^{st}$ PRE_DM# when the number of high logics of the bits included in the second data group DATA_B_BL#<2:7> is 0 to 3 or 6.

The first DM sub unit 331 may input low logic to the second pre-DM bit $2^{nd}$ PRE_DM# when the number of high logics of the bits included in the second data group DATA_B_BL#<2:7> is 4 or less.

The first DM sub unit 331 may input high logic to the second pre-DM bit $2^{nd}$ PRE_DM# when the number of high logics of the bits included in the second data group DATA_B_BL#<2:7> is 5 or more.

The second DM sub unit 333 may generate the DM flag bit DM_D# by performing an operation of determining whether the second pre-DM bit $2^{nd}$ PRE_DM# is corrected when the first pre-DM bit $1^{st}$ PRE_DM# is high logic. The second DM sub unit 333 may check whether an error has occurred in the bits included in the second data group DATA_B_BL#<2:7>, based on the second data DATA_B<0:127> and the second data error flag EF_DATA_B<0:127>.

Specifically, in a case where the first pre-DM bit $1^{st}$ PRE_DM# is high logic and the second pre-DM bit $2^{nd}$ PRE_DM# is low logic, the second DM sub unit 333 may generate the DM flag bit DM_D# of low logic when a bit in which an error occurs among the plurality of bits included in the second data group DATA_B_BL#<2:7> is high logic. When the bit in which the error occurs among the plurality of bits included in the second data group DATA_B_BL#<2:7> is high logic, the bit in which the error occurs is originally low logic, and thus it can be known that the number of high logics of the plurality of bits included in the first data group DATA_A_BL#<2:7> intended by the memory controller 102 is 3. Therefore, the number (4) of high logics of the plurality of bits included in the second data group DATA_B_BL#<2:7> is less than the masking value (5) and the number (3) of high logics of the plurality of bits included in the first data group DATA_A_BL#<2:7> is also less than the masking value (5), the logic of the DM flag bit DM_D# has the same low logic as that of the second pre-DM bit $2^{nd}$ PRE_DM#.

In addition, in a case where the first pre-DM bit $1^{st}$ PRE_DM# is high logic and the second pre-DM bit $2^{nd}$ PRE_DM# is low logic, the second DM sub unit 333 may generate the DM flag bit DM_D# of high logic when a bit in which an error occurs among the plurality of bits included in the second data group DATA_B_BL#<2:7> is low logic. When the bit in which the error occurs among the plurality of bits included in the second data group DATA_B_BL#<2:7> is low logic, the bit in which the error occurs is originally high logic, and thus it can be known that the number of high logics of the plurality of bits included in the first data group DATA_A_BL#<2:7> intended by the memory controller 102 is 5. Therefore, the number (4) of high logics of the plurality of bits included in the second data group DATA_B_BIL#<2:7> is less than the masking value (5) and the number (5) of high logics of the plurality of bits included in the first data group DATA_A_BL#<2:7> is equal to or greater than the masking value (5), the logic of the DM flag bit DM_D# has high logic different from the second pre-DM bit $2^{nd}$ PRE_DM#.

In addition, in a case where the first pre-DM bit $1^{st}$ PRE_DM# is high logic and the second pre-DM bit $2^{nd}$ PRE_DM# is high logic, the second DM sub unit 333 may generate the DM flag bit DM_D# of low logic when a bit in which an error occurs among the plurality of bits included in the second data group DATA_B_BL#<2:7> is high logic. When the bit in which the error occurs among the plurality of bits included in the second data group DATA_B_BL#<2:7> is high logic, the bit in which the error occurs is originally low logic, and thus it can be known that the number of high logics of the plurality of bits included in the first data group DATA_A_BL#<2:7> intended by the memory controller 102 is 4. Therefore, the number (5) of high logics of the plurality of bits included in the second data group DATA_B_BL#<2:7> is equal to or greater than the masking value (5) and the number (4) of high logics of the plurality of bits included in the first data group DATA_A_BL#<2:7> is less than the masking value (5), the logic of the DM flag bit DM_D# has low logic different from the second pre-DM bit $2^{nd}$ PRE_DM#.

In addition, in a case where the first pre-DM bit $1^{st}$ PRE_DM# is high logic and the second pre-DM bit $2^{nd}$ PRE_DM# is high logic, the second DM sub unit 333 may generate the DM flag bit DM_D# of high logic when a bit in which an error occurs among the plurality of bits included in the second data group DATA_B_BL#<2:7> is low logic. When the bit in which the error occurs among the plurality of bits included in the second data group DATA_B_BL#<2:7> is low logic, the bit in which the error occurs is originally high logic, and thus it can be known that the number of high logics of the plurality of bits included in the first data group DATA_A_BL#<2:7> intended by the memory controller 102 is 6. Therefore, the number (5) of high logics of the plurality of bits included in the second data group DATA_B_BL#<2:7> is equal to or greater than the masking value (5) and the number (6) of high logics of the plurality of bits included in the first data group DATA_A_BL#<2:7> is equal to or greater than the masking value (5), the logic of the DM flag bit DM_D# has the same high logic as that of the second pre-DM bit $1^{st}$ PRE_DM#.

Even when the first pre-DM bit $1^{st}$ PRE_DM# is high logic, if an error does not exist in the plurality of bits included in the second data group DATA_B_BL#<2:7> corresponding to the first pre-DM bit $1^{st}$ PRE_DM#, the second DM sub unit 333 may generate the DM flag bit DM_D# having the same logic as that of the second pre-DM bit $2^{nd}$ PRE_DM#.

When the first pre-DM bit $1^{st}$ PRE_DM# is low logic, the second DM sub unit 333 may generate the DM flag bit DM_D# having the same logic as that of the second pre-DM bit $2^{nd}$ PRE_DM#.

When the first pre-DM bit $1^{st}$ PRE_DM# is low logic, the number of high logics of the plurality of bits included in the second data group DATA_B_BL#<2:7> is 0 to 3 or 6.

In a case where the number of high logics of the plurality of bits included in the second data group DATA_B_BL#<2:7> is 5, even when the number of high logics of the plurality of bits included in the first data group DATA_A_BL#<2:7> is 4 on the assumption of single error, the number (4) of high logics of the plurality of bits included in the first data group DATA_A_BL#<2:7> is still less than the masking value (5). Therefore, the logic of the DM flag bit DM. D# may be the same as the logic of the second pre-DM bit $2^{nd}$ PRE_DM#.

In a case where the number of high logics of the plurality of bits included in the second data group DATA_B_BL#<2:7> is 6, even when the number of high logics of the plurality of bits included in the first data group DATA_A_BL#<2:7> is 5 on the assumption of single error, the number (5) of high logics of the plurality of bits included in the first data group DATA_A_BL#<2:7> is still equal to or greater than the masking value (5). Therefore, the logic of the DM flag bit DM_D# may be the same as the logic of the second pre-DM bit $2^{nd}$ PRE_DM#.

Therefore, in accordance with the present embodiment, when the DM unit 330 generates the DM flag DM_D<0:15>, the first DM sub unit 331 operates independently of the ECC unit. Therefore, there is an effect that reduces latency necessary for generating the DM flag DM_D<0:15>.

Figure 4A:
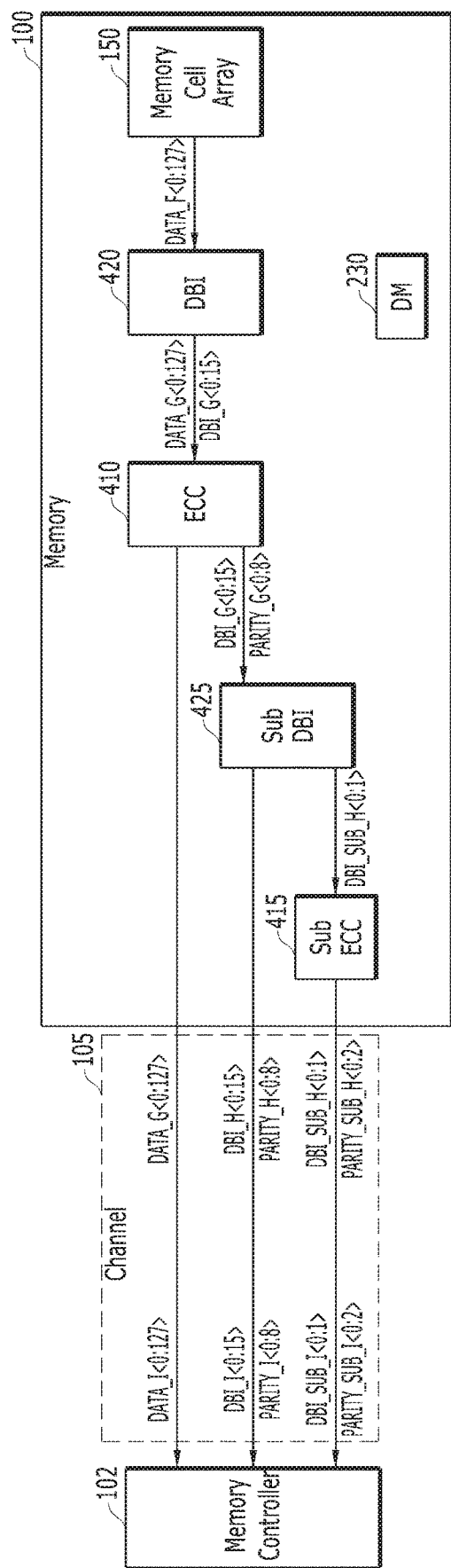
FIGS. 4A and 4B are schematic diagrams of a memory system including a DM unit in accordance with an embodiment.
Figure 4B:
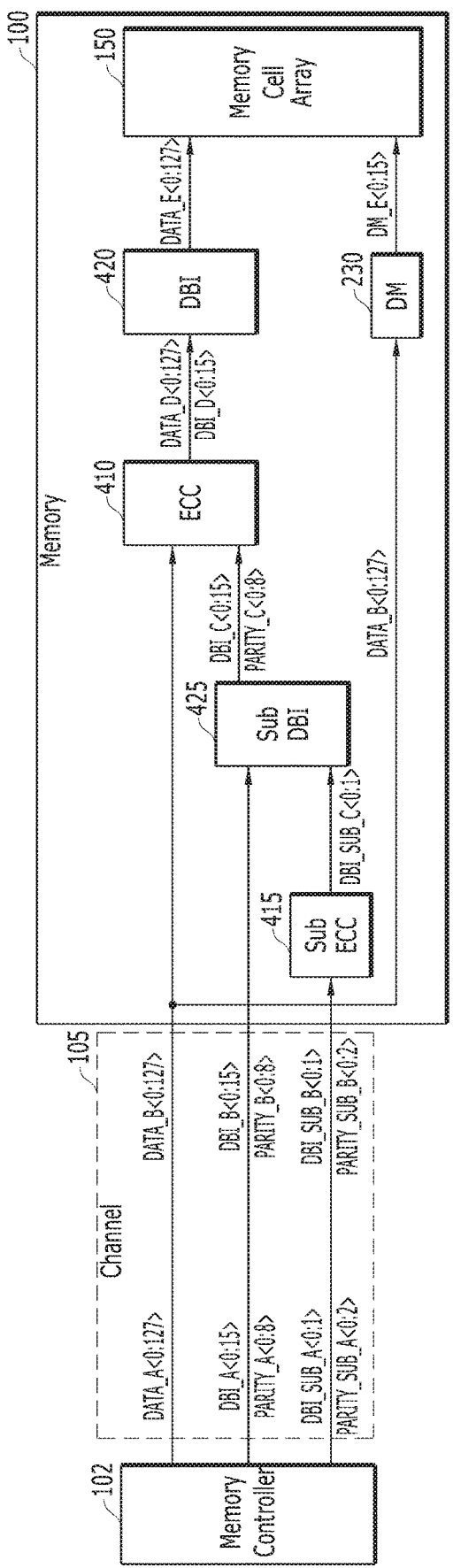

FIGS. 4A and 4B illustrate a memory system that repeatedly performs a DBI operation in a memory system in accordance with an embodiment.

FIG. 4A illustrates a data transmission process between a memory system 10 and a memory controller 102 in response to a read request from the memory controller 102.

A memory 100 in accordance with an embodiment may include a DBI unit 420, an ECC unit 410, a sub DBI unit 425, a sub ECC unit 415, and a DM unit 230.

The operation of the DM unit 230 is the same as the operation principle of the DM unit described with reference to FIGS. 2 and 3.

The sub DBI unit 425 and the sub ECC unit 415 have been described as being configured as units separate from the DBI unit 420 and the ECC unit 410, but this is merely one embodiment for convenience of explanation. The DBI unit 420 and the sub DBI unit 425 may be configured as one DBI unit, and the ECC unit 410 and the sub ECC unit 415 may also be configured as one ECC unit.

TABLE 9

|      | DQ0 | DQ1 | DQ2 | DQ3 | DQ4 | DQ5 | DQ6 | DQ7 |
|------|-----|-----|-----|-----|-----|-----|-----|-----|
| BL0  | 0   | 16  | 32  | 48  | 64  | 80  | 96  | 112 |
|      | [1] | [1] | [1] | [1] | [1] | [1] | [1] | [1] |
| BL1  | 1   | 17  | 33  | 49  | 65  | 81  | 97  | 113 |
|      | [1] | [1] | [1] | [1] | [1] | [1] | [1] | [1] |
| BL2  | 2   | 18  | 34  | 50  | 66  | 82  | 98  | 114 |
|      | [1] | [1] | [1] | [1] | [1] | [1] | [1] | [1] |
| BL3  | 3   | 19  | 35  | 51  | 67  | 83  | 99  | 115 |
|      | [1] | [1] | [1] | [1] | [1] | [1] | [1] | [1] |
| BL4  | 4   | 20  | 36  | 52  | 68  | 84  | 100 | 116 |
|      | [1] | [1] | [1] | [1] | [1] | [1] | [1] | [1] |
| BL5  | 5   | 21  | 37  | 53  | 69  | 85  | 101 | 117 |
|      | [1] | [1] | [1] | [1] | [1] | [1] | [1] | [1] |
| BL6  | 6   | 22  | 38  | 54  | 70  | 86  | 102 | 118 |
|      | [1] | [1] | [1] | [1] | [1] | [1] | [1] | [1] |
| BL7  | 7   | 23  | 39  | 55  | 71  | 87  | 103 | 119 |
|      | [1] | [1] | [1] | [1] | [1] | [1] | [1] | [1] |
| BL8  | 8   | 24  | 40  | 56  | 72  | 88  | 104 | 120 |
|      | [1] | [1] | [1] | [1] | [1] | [1] | [1] | [1] |
| BL9  | 9   | 25  | 41  | 57  | 73  | 89  | 105 | 121 |
|      | [1] | [1] | [1] | [1] | [1] | [1] | [1] | [1] |
| BL10 | 10  | 26  | 42  | 58  | 74  | 90  | 106 | 122 |
|      | [1] | [1] | [1] | [1] | [1] | [1] | [1] | [1] |
| BL11 | 11  | 27  | 43  | 59  | 75  | 91  | 107 | 123 |
|      | [1] | [1] | [1] | [1] | [1] | [1] | [1] | [1] |
| BL12 | 12  | 28  | 44  | 60  | 76  | 92  | 108 | 124 |
|      | [1] | [1] | [1] | [1] | [1] | [1] | [1] | [1] |
| BL13 | 13  | 29  | 45  | 61  | 77  | 93  | 109 | 125 |
|      | [1] | [1] | [1] | [1] | [1] | [1] | [1] | [1] |
| BL14 | 14  | 30  | 46  | 62  | 78  | 94  | 110 | 126 |
|      | [1] | [1] | [1] | [1] | [1] | [1] | [1] | [1] |
| BL15 | 15  | 31  | 47  | 63  | 79  | 95  | 111 | 127 |
|      | [1] | [1] | [1] | [1] | [1] | [1] | [1] | [1] |

Table 9 shows first data DATA_F<0:127> stored in a memory cell array. As described with reference to Table 1, the first data DATA_F<0:127> may be composed of zeroth to 127th bits, that is, a total of 128 bits. The first data DATA_F<0:127> may be divided into BL0 to BL15, that is, a total of 16 groups.

Table 9 shows the logic of each bit of the first data DATA_F<0:127>, in addition to the contents of Table 1. In Table 9, [1] may mean high logic of each bit.

The DBI unit 420 may determine whether 16 first data groups DATA_F_BL# constituting the first data DATA_F<0:127> are inverted, and generate second data DATA_G<0:127> and a second DBI flag DBI_G<0:15> that is inversion information about the second data DATA_G<0:127>.

TABLE 10

|     | DQ0 | DQ1 | DQ2 | DQ3 | DQ4 | DQ5 | DQ6 | DQ7 | DBI |
|-----|-----|-----|-----|-----|-----|-----|-----|-----|-----|
| BL0 | 0   | 16  | 32  | 48  | 64  | 80  | 96  | 112 | 0   |
|     | [0] | [0] | [0] | [0] | [0] | [0] | [0] | [0] | [1] |
| BL1 | 1   | 17  | 33  | 49  | 65  | 81  | 97  | 113 | 1   |
|     | [0] | [0] | [0] | [0] | [0] | [0] | [0] | [0] | [1] |
| BL2 | 2   | 18  | 34  | 50  | 66  | 82  | 98  | 114 | 2   |
|     | [0] | [0] | [0] | [0] | [0] | [0] | [0] | [0] | [1] |
| BL3 | 3   | 19  | 35  | 51  | 67  | 83  | 99  | 115 | 3   |
|     | [0] | [0] | [0] | [0] | [0] | [0] | [0] | [0] | [1] |
| BL4 | 4   | 20  | 36  | 52  | 68  | 84  | 100 | 116 | 4   |
|     | [0] | [0] | [0] | [0] | [0] | [0] | [0] | [0] | [1] |
| BL5 | 5   | 21  | 37  | 53  | 69  | 85  | 101 | 117 | 5   |
|     | [0] | [0] | [0] | [0] | [0] | [0] | [0] | [0] | [1] |
| BL6 | 6   | 22  | 38  | 54  | 70  | 86  | 102 | 118 | 6   |
|     | [0] | [0] | [0] | [0] | [0] | [0] | [0] | [0] | [1] |
| BL7 | 7   | 23  | 39  | 55  | 71  | 87  | 103 | 119 | 7   |
|     | [0] | [0] | [0] | [0] | [0] | [0] | [0] | [0] | [1] |

TABLE 10-continued

| | DQ0 | DQ1 | DQ2 | DQ3 | DQ4 | DQ5 | DQ6 | DQ7 | DBI |
|---|---|---|---|---|---|---|---|---|---|
| BL8 | 8 | 24 | 40 | 56 | 72 | 88 | 104 | 120 | 8 |
| | [0] | [0] | [0] | [0] | [0] | [0] | [0] | [0] | [1] |
| BL9 | 9 | 25 | 41 | 57 | 73 | 89 | 105 | 121 | 9 |
| | [0] | [0] | [0] | [0] | [0] | [0] | [0] | [0] | [1] |
| BL10 | 10 | 26 | 42 | 58 | 74 | 90 | 106 | 122 | 10 |
| | [0] | [0] | [0] | [0] | [0] | [0] | [0] | [0] | [1] | in DATA_F0, DATA_F16, DATA_F32, DATA_F48, DATA_F80, DATA_F96, and DATA_F112, which correspond to the first data group 0 DATA_F_BL0, is 5 or more. Therefore, the logic of bits corresponding to the first data group 0 DATA_F_BL0 may be inverted. High logic may be input to DBI_G0 in the sense that the inversion operation has been performed on the first data group 0 DATA_F_BL0. Similarly, the DBI operation may be performed up to the first data group 15 DATA_F_BL15.

TABLE 11

| | DQ0 | DQ1 | DQ2 | DQ3 | DQ4 | DQ5 | DQ6 | DQ7 | DBI | PARITY |
|---|---|---|---|---|---|---|---|---|---|---|
| BL0 | 0 | 16 | 32 | 48 | 64 | 80 | 96 | 112 | 0 | 0 |
| | [0] | [0] | [0] | [0] | [0] | [0] | [0] | [0] | [1] | [1] |
| BL1 | 1 | 17 | 33 | 49 | 65 | 81 | 97 | 113 | 1 | 1 |
| | [0] | [0] | [0] | [0] | [0] | [0] | [0] | [0] | [1] | [1] |
| BL2 | 2 | 18 | 34 | 50 | 66 | 82 | 98 | 114 | 2 | 2 |
| | [0] | [0] | [0] | [0] | [0] | [0] | [0] | [0] | [1] | [1] |
| BL3 | 3 | 19 | 35 | 51 | 67 | 83 | 99 | 115 | 3 | 3 |
| | [0] | [0] | [0] | [0] | [0] | [0] | [0] | [0] | [1] | [1] |
| BL4 | 4 | 20 | 36 | 52 | 68 | 84 | 100 | 116 | 4 | 4 |
| | [0] | [0] | [0] | [0] | [0] | [0] | [0] | [0] | [1] | [1] |
| BL5 | 5 | 21 | 37 | 53 | 69 | 85 | 101 | 117 | 5 | 5 |
| | [0] | [0] | [0] | [0] | [0] | [0] | [0] | [0] | [1] | [1] |
| BL6 | 6 | 22 | 38 | 54 | 70 | 86 | 102 | 118 | 6 | 6 |
| | [0] | [0] | [0] | [0] | [0] | [0] | [0] | [0] | [1] | [1] |
| BL7 | 7 | 23 | 39 | 55 | 71 | 87 | 103 | 119 | 7 | 7 |
| | [0] | [0] | [0] | [0] | [0] | [0] | [0] | [0] | [1] | [1] |
| BL8 | 8 | 24 | 40 | 56 | 72 | 88 | 104 | 120 | 8 | 8 |
| | [0] | [0] | [0] | [0] | [0] | [0] | [0] | [0] | [1] | [1] |
| BL9 | 9 | 25 | 41 | 57 | 73 | 89 | 105 | 121 | 9 | 9 |
| | [0] | [0] | [0] | [0] | [0] | [0] | [0] | [0] | [1] | |
| BL10 | 10 | 26 | 42 | 58 | 74 | 90 | 106 | 122 | 10 | 10 |
| | [0] | [0] | [0] | [0] | [0] | [0] | [0] | [0] | [1] | |
| BL11 | 11 | 27 | 43 | 59 | 75 | 91 | 107 | 123 | 11 | 11 |
| | [0] | [0] | [0] | [0] | [0] | [0] | [0] | [0] | [1] | |
| BL12 | 12 | 28 | 44 | 60 | 76 | 92 | 108 | 124 | 12 | 12 |
| | [0] | [0] | [0] | [0] | [0] | [0] | [0] | [0] | [1] | |
| BL13 | 13 | 29 | 45 | 61 | 77 | 93 | 109 | 125 | 13 | 13 |
| | [0] | [0] | [0] | [0] | [0] | [0] | [0] | [0] | [1] | |
| BL14 | 14 | 30 | 46 | 62 | 78 | 94 | 110 | 126 | 14 | 14 |
| | [0] | [0] | [0] | [0] | [0] | [0] | [0] | [0] | [1] | |
| BL15 | 15 | 31 | 47 | 63 | 79 | 95 | 111 | 127 | 15 | 15 |
| | [0] | [0] | [0] | [0] | [0] | [0] | [0] | [0] | [1] | |

TABLE 10-continued

| | DQ0 | DQ1 | DQ2 | DQ3 | DQ4 | DQ5 | DQ6 | DQ7 | DBI |
|---|---|---|---|---|---|---|---|---|---|
| BL11 | 11 | 27 | 43 | 59 | 75 | 91 | 107 | 123 | 11 |
| | [0] | [0] | [0] | [0] | [0] | [0] | [0] | [0] | [1] |
| BL12 | 12 | 28 | 44 | 60 | 76 | 92 | 108 | 124 | 12 |
| | [0] | [0] | [0] | [0] | [0] | [0] | [0] | [0] | [1] |
| BL13 | 13 | 29 | 45 | 61 | 77 | 93 | 109 | 125 | 13 |
| | [0] | [0] | [0] | [0] | [0] | [0] | [0] | [0] | [1] |
| BL14 | 14 | 30 | 46 | 62 | 78 | 94 | 110 | 126 | 14 |
| | [0] | [0] | [0] | [0] | [0] | [0] | [0] | [0] | [1] |
| BL15 | 15 | 31 | 47 | 63 | 79 | 95 | 111 | 127 | 15 |
| | [0] | [0] | [0] | [0] | [0] | [0] | [0] | [0] | [1] |

Table 10 shows the results obtained when the DBI unit 420 applies the inversion operation to the first data DATA_F<0:127> corresponding to Table 9. [0] in Table 10 may mean low logic. The DBI unit 420 may generate second data DATA_G<0:127>, to which DBI is applied, and a second DBI flag DBI_G<0:15> that is inversion information about the second data DATA_G<0:127>.

According to the example presented in Tables 9 and 10, the DBI unit 420 may determine whether the number of high logics is equal to or greater than a majority (5) for each first data group DATA_F_BL#. The number of bits of high logic Table 11 shows the results obtained when the ECC unit 410 performs an ECC operation on the second data DATA_G<0:127> and the second DBI flag DBI_G<0:15>.

The ECC unit 410 may generate the second parity PARITY_G<0:8> according to a scheme defined in hamming code with respect to the second data DATA_G<0:127> and the second DBI flag DBI_G<0:15>.

An error occurring while the second data DATA_G<0:127> and the second DBI flag DBI_G<0:15> are transmitted to the memory controller 102 through the channel 105 may be corrected through the second parity PARITY_G<0:8>.

Referring to the example presented in Table 11, the number of high logics that the second DBI flag DBI_G<0:15> and the second parity PARITY_G<0:8> have is 25.

As such, as the number of transmitted data bits increases, the number of DBI flags and parities corresponding to the data increases. Therefore, when the bits of the DBI flags and the parities have a lot of high logics, much power consumption is required.

Therefore, an embodiment provides a method of repeatedly performing a DBI operation so as to reduce the number of high logics that the bits of the DBI flag and the parities have.

TABLE 12

|     | DQ0 | DQ1 | DQ2 | DQ3 | DQ4 | DQ5 | DQ6 | DQ7 | DBI | PARITY |
| --- | --- | --- | --- | --- | --- | --- | --- | --- | --- | --- |
| BL0 | 0 | 16 | 32 | 48 | 64 | 80 | 96 | 112 | 0 | 0 |
|     | [0] | [0] | [0] | [0] | [0] | [0] | [0] | [0] | [0] | [0] |
| BL1 | 1 | 17 | 33 | 49 | 65 | 81 | 97 | 113 | 1 | 1 |
|     | [0] | [0] | [0] | [0] | [0] | [0] | [0] | [0] | [0] | [0] |
| BL2 | 2 | 18 | 34 | 50 | 66 | 82 | 98 | 114 | 2 | 2 |
|     | [0] | [0] | [0] | [0] | [0] | [0] | [0] | [0] | [0] | [0] |
| BL3 | 3 | 19 | 35 | 51 | 67 | 83 | 99 | 115 | 3 | 3 |
|     | [0] | [0] | [0] | [0] | [0] | [0] | [0] | [0] | [0] | [0] |
| BL4 | 4 | 20 | 36 | 52 | 68 | 84 | 100 | 116 | 4 | 4 |
|     | [0] | [0] | [0] | [0] | [0] | [0] | [0] | [0] | [0] | [0] |
| BL5 | 5 | 21 | 37 | 53 | 69 | 85 | 101 | 117 | 5 | 5 |
|     | [0] | [0] | [0] | [0] | [0] | [0] | [0] | [0] | [0] | [0] |
| BL6 | 6 | 22 | 38 | 54 | 70 | 86 | 102 | 118 | 6 | 6 |
|     | [0] | [0] | [0] | [0] | [0] | [0] | [0] | [0] | [0] | [0] |
| BL7 | 7 | 23 | 39 | 55 | 71 | 87 | 103 | 119 | 7 | 7 |
|     | [0] | [0] | [0] | [0] | [0] | [0] | [0] | [0] | [0] | [0] |
| BL8 | 8 | 24 | 40 | 56 | 72 | 88 | 104 | 120 | 8 | 8 |
|     | [0] | [0] | [0] | [0] | [0] | [0] | [0] | [0] | [0] | [0] |
| BL9 | 9 | 25 | 41 | 57 | 73 | 89 | 105 | 121 | 9 | 9 |
|     | [0] | [0] | [0] | [0] | [0] | [0] | [0] | [0] | [0] | [1] |
| BL10 | 10 | 26 | 42 | 58 | 74 | 90 | 106 | 122 | 10 | 10 |
|     | [0] | [0] | [0] | [0] | [0] | [0] | [0] | [0] | [0] | [1] |
| BL11 | 11 | 27 | 43 | 59 | 75 | 91 | 107 | 123 | 11 | 11 |
|     | [0] | [0] | [0] | [0] | [0] | [0] | [0] | [0] | [0] | [0] |
| BL12 | 12 | 28 | 44 | 60 | 76 | 92 | 108 | 124 | 12 | 12 |
|     | [0] | [0] | [0] | [0] | [0] | [0] | [0] | [0] | [0] | [0] |
| BL13 | 13 | 29 | 45 | 61 | 77 | 93 | 109 | 125 | 13 | 13 |
|     | [0] | [0] | [0] | [0] | [0] | [0] | [0] | [0] | [0] | [0] |
| BL14 | 14 | 30 | 46 | 62 | 78 | 94 | 110 | 126 | 14 | 14 |
|     | [0] | [0] | [0] | [0] | [0] | [0] | [0] | [0] | [0] | [0] |
| BL15 | 15 | 31 | 47 | 63 | 79 | 95 | 111 | 127 | 15 | 15 |
|     | [0] | [0] | [0] | [0] | [0] | [0] | [0] | [0] | [0] | [0] |

Table 12 shows the results obtained when the sub DBI unit 425 determines whether the second DBI flag DBI_G<0:127> and the second parity PARITY<0:8> are inverted.

The sub DBI unit 425 may determine whether the second DBI flag DBI_G<0:127> and the second parity PARITY<0:8> are inverted, and generate a third DBI flag DBI_H<0:15> and a third parity PARITY_H<0:8>. In addition, the sub DBI unit 425 may generate a third sub DBI flag DBI_SUB_H<0:1> that is inversion information about the third DBI flag DBI_H<0:15> and the third parity PARITY_H<0:8>.

The third sub DBI flag DBI_SUB_H<0:1> may be transmitted through a PARITY channel through which the third parity PARITY_H<0:8> is transmitted. As illustrated in Table 12, each bit of the third sub DBI flag DBI_SUB_H<0:1> having high logic may be transmitted through PARITY_9 and PARITY_10 of the PARITY channel. The third sub DBI flag DBI_SUB_H<0:1> may be transmitted through channels other than the PARITY channel, and the present invention is not limited to the type of the channel used.

For reference, the DBI unit 420 and the sub DBI unit 425 may be operated by DBI DC, DBI AC, or other similar DBI coding schemes. The DBI DC is directed to reducing high logic for each data group as in the above-described embodiment. The DBI AC is directed to reducing a change between high logic and low logic for each data group.

TABLE 13

|     | DQ0 | DQ1 | DQ2 | DQ3 | DQ4 | DQ5 | DQ6 | DQ7 | DBI | PARITY |
| --- | --- | --- | --- | --- | --- | --- | --- | --- | --- | --- |
| BL0 | 0 | 16 | 32 | 48 | 64 | 80 | 96 | 112 | 0 | 0 |
|     | [0] | [0] | [0] | [0] | [0] | [0] | [0] | [0] | [0] | [0] |
| BL1 | 1 | 17 | 33 | 49 | 65 | 81 | 97 | 113 | 1 | 1 |
|     | [0] | [0] | [0] | [0] | [0] | [0] | [0] | [0] | [0] | [0] |
| BL2 | 2 | 18 | 34 | 50 | 66 | 82 | 98 | 114 | 2 | 2 |
|     | [0] | [0] | [0] | [0] | [0] | [0] | [0] | [0] | [0] | [0] |
| BL3 | 3 | 19 | 35 | 51 | 67 | 83 | 99 | 115 | 3 | 3 |
|     | [0] | [0] | [0] | [0] | [0] | [0] | [0] | [0] | [0] | [0] |
| BL4 | 4 | 20 | 36 | 52 | 68 | 84 | 100 | 116 | 4 | 4 |
|     | [0] | [0] | [0] | [0] | [0] | [0] | [0] | [0] | [0] | [0] |
| BL5 | 5 | 21 | 37 | 53 | 69 | 85 | 101 | 117 | 5 | 5 |
|     | [0] | [0] | [0] | [0] | [0] | [0] | [0] | [0] | [0] | [0] |
| BL6 | 6 | 22 | 38 | 54 | 70 | 86 | 102 | 118 | 6 | 6 |
|     | [0] | [0] | [0] | [0] | [0] | [0] | [0] | [0] | [0] | [0] |
| BL7 | 7 | 23 | 39 | 55 | 71 | 87 | 103 | 119 | 7 | 7 |
|     | [0] | [0] | [0] | [0] | [0] | [0] | [0] | [0] | [0] | [0] |
| BL8 | 8 | 24 | 40 | 56 | 72 | 88 | 104 | 120 | 8 | 8 |
|     | [0] | [0] | [0] | [0] | [0] | [0] | [0] | [0] | [0] | [0] |
| BL9 | 9 | 25 | 41 | 57 | 73 | 89 | 105 | 121 | 9 | 9 |
|     | [0] | [0] | [0] | [0] | [0] | [0] | [0] | [0] | [0] | [1] |
| BL10 | 10 | 26 | 42 | 58 | 74 | 90 | 106 | 122 | 10 | 10 |
|     | [0] | [0] | [0] | [0] | [0] | [0] | [0] | [0] | [0] | [1] |

TABLE 13-continued

|      | DQ0 | DQ1 | DQ2 | DQ3 | DQ4 | DQ5 | DQ6 | DQ7 | DBI | PARITY |
|------|-----|-----|-----|-----|-----|-----|-----|-----|-----|--------|
| BL11 | 11  | 27  | 43  | 59  | 75  | 91  | 107 | 123 | 11  | 11     |
|      | [0] | [0] | [0] | [0] | [0] | [0] | [0] | [0] | [0] | [0]    |
| BL12 | 12  | 28  | 44  | 60  | 76  | 92  | 108 | 124 | 12  | 12     |
|      | [0] | [0] | [0] | [0] | [0] | [0] | [0] | [0] | [0] | [1]    |
| BL13 | 13  | 29  | 45  | 61  | 77  | 93  | 109 | 125 | 13  | 13     |
|      | [0] | [0] | [0] | [0] | [0] | [0] | [0] | [0] | [0] | [1]    |
| BL14 | 14  | 30  | 46  | 62  | 78  | 94  | 110 | 126 | 14  | 14     |
|      | [0] | [0] | [0] | [0] | [0] | [0] | [0] | [0] | [0] |        |
| BL15 | 15  | 31  | 47  | 63  | 79  | 95  | 111 | 127 | 15  | 15     |
|      | [0] | [0] | [0] | [0] | [0] | [0] | [0] | [0] | [0] |        |

Table 13 shows that the sub ECC unit 415 generates a third sub parity PARITY_SUB_H<0:2> that is an error correction parity for the third sub DBI flag DBI_SUB_H<0:1>.

The sub ECC unit 415 may generate the third sub parity PARITY_SUB_H<0:2> according to a scheme defined in hamming code with respect to the third sub DBI flag DBI_SUB_H<0:1>.

According to the example presented in Table 13, the logic of each bit constituting the third sub parity PARITY_SUB_H<0:2> may be low logic, high logic, and high logic in this order. That is, the third sub parity 0 PARITY_SUB_H0 may have low logic, the third sub parity 1 PARITY_SUB_H1 may have high logic, and the third sub parity 2 PARITY_SUB_H2 may have high logic.

The third sub parity PARITY_SUB_H<0:2> may be transmitted through the PARITY channel through which the third parity PARITY_H<0:8> is transmitted. As illustrated in Table 12, each bit of the third sub parity PARITY_SUB_H<0:2> may be transmitted through PARITY_11, PARITY_12, and PARITY_13 of the PARITY channel. The third sub parity PARITY_SUB_H<0:2> may be transmitted through channels other than the PARITY channel, and the present invention is not limited to the type of the channel used.

The memory 100 may transmit the second data DATA_G<0:127>, the third DBI flag DBI_H<0:15>, the third parity PARITY_H<0:8>, the third sub DBI flag DBI_SUB_H<0:1>, and the third sub parity PARITY_SUB_H<0:2> to the memory controller 102 through the channel 105. The memory controller may receive the second data DATA_-G<0:127>, the third DBI flag DBI_H<0:15>, the third parity PARITY_H<0:8>, the third sub DBI flag DBI_SUB_H<0:1>, and the third sub parity PARITY_SUB_H<0:2> in the form of third data DATA_I<0:127>, a fourth DBI flag DBI_I<0:15>, a fourth parity PARITY_I<0:8>, a fourth DBI sub flag DBI_SUB_I<0:1>, and a fourth sub parity PARITY_SUB_I<0:2>, respectively.

As described above, the memory system in accordance with the present embodiment has an effect that reduces power consumption according to high logic by repeatedly performing the DBI operation.

FIG. 4B illustrates a data transmission process between a memory system 10 and a memory controller 102 in response to a write request from the memory controller 102. The same principle as described with reference to FIG. 4A and Tables 9 to 13 may be applied to the operation of the memory system 10 illustrated in FIG. 4B. For a more detailed description of FIG. 4B below, the contents described with reference to FIG. 4A and Tables 9 to 13 can be referred to.

A memory 100 in accordance with an embodiment may include a DBI unit 420, an ECC unit 410, a sub DBI unit 425, a sub ECC unit 415, and a DM unit 230.

The operation of the DM unit 230 is the same as the operation principle of the DM unit described with reference to FIGS. 2 and 3.

The memory controller 102 may transmit the first data DATA_A<0:127>, the first DBI flag DBI_B<0:15>, the first parity PARITY_A<0:8>, the first DBI sub flag DBI_SUB_A<0:1>, and the first sub parity PARITY_SUB_A<0:2> to the memory 100 of the memory system 10 through the channel 105.

The first data DATA_A<0:127>, the first DBI flag DBI_B<0:15>, the first parity PARITY_A<0:8>, the first DBI sub flag DBI_SUB_A<0:1>, and the first sub parity PARITY_SUB_A<0:2> pass through the channel 105, and then may be input to the memory 100 in the form of the second data DATA_B<0:127>, the second DBI flag DBI_B<0:15>, the second parity PARITY_B<0:8>, the second sub DBI flag DBI_SUB_B<0:1>, and the second sub parity PARITY_SUB_B<0:2>, which have a possibility of occurrence of an error.

The memory 100 may receive the second sub DBI flag DBI_SUB_B<0:1> and the second sub parity PARITY_SUB_B<0:2> through the same channel as the channel through which the second parity PARITY_B<0:8> is transmitted. The channel through which the second parity PARITY_B<0:8> may be a PARITY channel as described with reference to Tables 11 to 13. The PARITY channel may include a PARITY pin through which data is transmitted and a PARITY pin through which data is received. The PARITY pin may have the same configuration as that of a DQ pin through which data is transmitted.

The second sub DBI flag DBI_SUB_B<0:1> and the second sub parity PARITY_SUB_B<0:2> may be transmitted through channels other than the PARITY channel, and the present invention is not limited to the type of the channel used.

The sub ECC unit 415 may generate a third sub DBI flag DBI_SUB_C<0:1> by correcting errors of the second sub DBI flag DBI_SUB_B<0:1>, based on the second sub parity PARITY_SUB_B<0:2>. The method by which the sub ECC unit 415 corrects the error may include various ECC schemes, including hamming code.

The sub DBI unit 425 may determine whether the second DBI flag DBI_B<0:15> and the second parity PARITY_B<0:8> are inverted, based on the third sub DBI flag DBI_SUB_C<0:1>, and generate a third DBI flag DBI_C<0:15> and a third parity PARITY_C<0:8>.

The ECC unit 410 may generate third data DATA_D<0:127> and a fourth DBI flag DBI_D<0:15> by correcting errors of the second data DATA_B<0:127> and the third DBI flag DBI_C<0:15> based on the third parity PARITY_C<0:8>.

The DBI unit 420 may determine whether the third data DATA_D<0:127> is inverted, based on the fourth DBI flag DBI_D<0:15>, and generate fourth data DATA_E<0:127>. The fourth data may be stored in the memory cell array 150.

As described above, the memory system in accordance with the present embodiment has an effect that reduces power consumption according to high logic by repeatedly performing the DBI operation.

For reference, the sub DBI unit 425 and the sub ECC unit 415 have been described as being configured as units separate from the DBI unit 420 and the ECC unit 410, but this is merely one embodiment for convenience of explanation. The DBI unit 420 and the sub DBI unit 425 may be configured as one DBI unit, and the ECC unit 410 and the sub ECC unit 415 may also be configured as one ECC unit.

For reference, the memory controller 102 of FIG. 4A may operate in the same manner as the write operation of the memory system 10 described with reference to FIG. 4B. Specifically, the memory controller 102 may perform the write operation by including the DBI unit 420, the ECC unit 410, the sub DBI unit 425, and the sub ECC unit 415 in the same manner as the memory system 10. In the same principle, the memory controller 102 of FIG. 4B may operate in the same manner as the read operation of the memory system 10 described with reference to FIG. 4A. Specifically, the memory controller 102 may perform the read operation by including the DBI unit 420, the ECC unit 410, the sub DBI unit 425, and the sub ECC unit 415.

Figure 5:
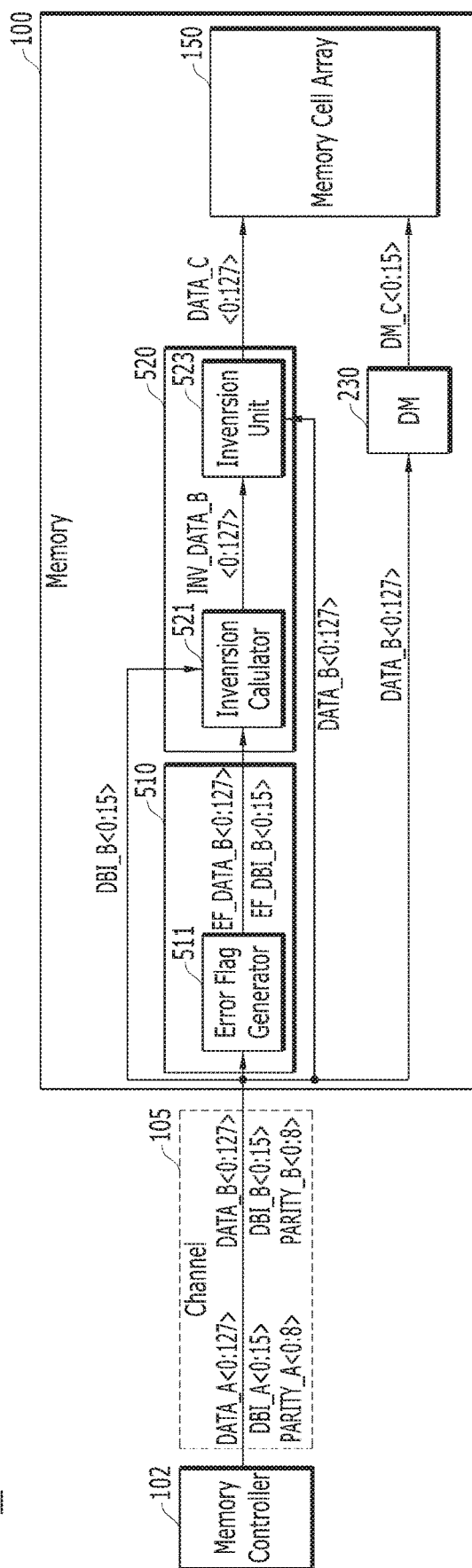
FIG. 5 is a schematic diagram of a memory system including a DM unit in accordance with an embodiment.

FIG. 5 illustrates a memory system which is capable of simultaneously performing an error correcting function and a data inverting function in accordance with an embodiment.

A memory 100 in accordance with an embodiment may include an ECC unit 510, a DBI unit 520, and a DM unit 230.

The operation of the DM unit 230 is the same as the operation principle of the DM unit described with reference to FIGS. 2 and 3.

A memory controller 102 may transmit first data DATA_A<0:127>, a first DBI flag DBI_A<0:15>, and a first parity PARITY_A<0:8> to the memory 100.

The first data DATA_A<0:127>, the first DBI flag DBI_A<0:15>, and the first parity PARITY_A<0:8>, which pass through the channel, may be input in the form of second data DATA_B<0:127>, a second DBI flag DBI_B<0:15>, and a second parity PARITY_B<0:8>, respectively.

Second data DATA_B<0:127>, a second DBI flag DBI_B<0:15>, and a second parity PARITY_B<0:8> may include bits in which an error occurs.

The ECC unit 510 may include an error flag generator 511. The error flag generator 511 may generate a second data error flag EF_DATA_B<0:127> and a second DBI error flag EF_DBI_B<0:15> that are error information of the second data DATA_B<0:127> and the second DBI flag DBI_B<0: 15>, based on the second parity PARITY_B<0:8>.

The method by which the error flag generator 511 generates the second data error flag EF_DATA_B<0:127> and the second DBI error flag EF_DBI_B<0:15> may be representatively performed according to a hamming code rule, or may be performed by various ECC schemes. When the ECC unit 510 is performed according to the hamming code rule, the ECC unit 510 may be performed according to a single error correction (SEC) scheme or a single error correction double error detection (SECDED) scheme. For example, the ECC unit 510 may generate the second data error flag EF_DATA_B<0:127> and the second DBT error flag EF_D-BI_B<0:15> that are error information of the second data DATA_B<0:127> and the second DBI flag DBI_B<0:15>, based on the second parity PARITY_B<0:8> according to the SECDED scheme.

The DBI unit 520 in accordance with the present embodiment may generate third data, to which the results of the error correction operation and the DBI operation on the second data DATA_B<0:127> are reflected through the second data DATA_B<0:127>, the second DBI flag DBI_B<0:15>, the second data error flag EF_DATA_B<0: 127>, and the second DBI error flag EF_DBI_B<0:15>.

The DBI unit 520 may include an inversion calculator 521 and an inversion unit 523.

The inversion calculator 521 may generate a second data final inversion flag INV_DATA_B<0:127>, which is final inversion information about the second data DATA_B<0: 127>, through the second DBI flag DBI_B<0:15>, the second error flag EF_DATA_B<0:127>, and the second DBI error flag EF_DBI_B<0:15>.

The second data final inversion flag INV_DATA_B<0: 127> may indicate the result to which the results of the error correction operation and the DBI operation on the second data DATA_B<0:127> are all applied. For example, the second data final inversion flag bit having high logic among the second data final inversion flag bits constituting the second data final inversion flag INV_DATA_B<0:127> is the result to which the results of the error correction operation and the DBI operation are all reflected, and may invert the second data bit corresponding to the second data final inversion flag bit. In addition, the second data final inversion flag bit having low logic among the second data final inversion flag bits constituting the second data final inversion flag INV_DATA_B<0:127> is the result to which the results of the error correction operation and the DBI operation are all reflected, and may not invert the second data bit corresponding to the second data final inversion flag bit.

TABLE 14

| EF_DATA_B | DQ0 | DQ1 | DQ2 | DQ3 | DQ4 | DQ5 | DQ6 | DQ7 | DBI_B | EF_DBI_B |
|---|---|---|---|---|---|---|---|---|---|---|
| BL0 | 0 | 16 | 32 | 48 | 64 | 80 | 96 | 112 | 0 | 0 |
| BL1 | 1 | 17 | 33 | 49 | 65 | 81 | 97 | 113 | 1 | 1 |
| BL2 | 2 | 18 | 34 | 50 | 66 | 82 | 98 | 114 | 2 | 2 |
| BL3 | 3 | 19 | 35 | 51 | 67 | 83 | 99 | 115 | 3 | 3 |
| BL4 | 4 | 20 | 36 | 52 | 68 | 84 | 100 | 116 | 4 | 4 |
| BL5 | 5 | 21 | 37 | 53 | 69 | 85 | 101 | 117 | 5 | 5 |
| BL6 | 6 | 22 | 38 | 54 | 70 | 86 | 102 | 118 | 6 | 6 |
| BL7 | 7 | 23 | 39 | 55 | 71 | 87 | 103 | 119 | 7 | 7 |
| BL8 | 8 | 24 | 40 | 56 | 72 | 88 | 104 | 120 | 8 | 8 |
| BL9 | 9 | 25 | 41 | 57 | 73 | 89 | 105 | 121 | 9 | 9 |
| BL10 | 10 | 26 | 42 | 58 | 74 | 90 | 106 | 122 | 10 | 10 |
| BL11 | 11 | 27 | 43 | 59 | 75 | 91 | 107 | 123 | 11 | 11 |
| BL12 | 12 | 28 | 44 | 60 | 76 | 92 | 108 | 124 | 12 | 12 |
| BL13 | 13 | 29 | 45 | 61 | 77 | 93 | 109 | 125 | 13 | 13 |
| BL14 | 14 | 30 | 46 | 62 | 78 | 94 | 110 | 126 | 14 | 14 |
| BL15 | 15 | 31 | 47 | 63 | 79 | 95 | 111 | 127 | 15 | 15 |

Table 14 sequentially shows the second data error flag EF_DATA_B<0:127>, the second DBI flag DBI_B<0:15>, and the second DBI error flag EF_DBI_B<0:15> for generating the second data final inversion flag INV_DATA_B<0:127>.

The second data error flag may include a plurality of second data error flag groups. As described with reference to Table 1, the second data error flag may be composed of BL0 to BL15, that is, a total of 16 second data error flag groups. The second data error flag may have the same configuration as the second data.

The second data error flag bit corresponding to the second data bit may indicate whether an error exists in the second data bit. For example, a case where the second data error flag bit is high logic may mean that an error exists in the second data bit corresponding to the second data error flag bit. Similarly, a case where the second data error flag bit is low logic may mean that an error does not exist in the second data bit corresponding to the second data error flag bit.

The second DBI flag DBI_B<0:15> may include a plurality of second DBI flag bits and the number thereof is assumed to be 16 for convenience of explanation.

The second DBI error flag EF_DBI_B<0:15> may include a plurality of second DBI error flag bits and the number thereof is assumed to be 16 for convenience of explanation.

The second DBI error flag bits may correspond to the second DBI flag bits for each BL group. For example, the second DBI flag bit 0 corresponding to the BL0 group may correspond to the second DBI error flag bit 0 corresponding to the BL0 group. In addition, the second DBI flag bit 0 and the second DBI error flag bit 0 may correspond to the second data error flag group 0 EF_DATA_B_BL0 corresponding to the BL0 group.

According to the conventional ECC operation and DBI operation described with reference to FIG. 1, the DBI operation has been performed after the completion of the ECC operation. In this case, an inversion may occur in the data bit while the error is corrected according to the ECC operation. Then, an inversion may occur once more in the data bit in which the inversion has occurred according to the DBI operation. In this case, in a case where the inversion is not performed even once or in a case where the inversion is performed twice, the same results are obtained with respect to the data bit. Since the results are equal but the inversion operation requires power consumption, more power consumption is required in the case where the inversion is performed twice than in the case where the inversion is not performed even once.

Therefore, in accordance with an embodiment, in a case such as the data bit, there is proposed a DBI unit which does not perform the inversion twice or more times in any cases, that is, performs the inversion at most once.

TABLE 15

| EF_DATA_B | DQ0 | DQ1 | DQ2 | DQ3 | DQ4 | DQ5 | DQ6 | DQ7 | DBI_B | EF_DBI_B |
|---|---|---|---|---|---|---|---|---|---|---|
| BL0 | 0 [1] | 16 [0] | 32 [0] | 48 [0] | 64 [0] | 80 [0] | 96 [0] | 112 [0] | 0 [1] | 0 [1] |

Table 15 shows the second data error flag group 0 EF_DATA_B0, EF_DATA_B16, EF_DATA_B32, EF_DATA_B48, EF_DATA_B64, EF_DATA_B80, EF_DATA_B96, and EF_DATA_B112, which correspond to the BL0 group, the second DBI flag bit 0 DBI_B0, and the second DBI error flag bit 0 EF_DBI_B0. In Table 15, [1] may mean high logic, and [0] may mean low logic.

It can be seen from Table 15 that the second data error flag bit 0 EF_DATA_B0 has high logic, the second DBI flag bit 0 DBI_B0 has high logic, and the second DBI error flag bit 0 EF_DBI_B0 has high logic.

That the second data error flag bit 0 EF_DATA_B0 is high logic means that an error exists in the second data bit 0 DATA_B0 corresponding to the second data error flag bit 0 EF_DATA_B0. Therefore, the second data bit 0 DATA_B0 must be inverted once.

In addition, since both the second DBI flag bit 0 DBI_B0 and the second DBI error flag bit 0 EF_DBI_B0 are high logic, it means that an error exists in the second DBI flag bit 0 DBI_B0, and it can be seen that the logic of the error-corrected second DBI flag bit 0 DBI_B0 is low logic. Therefore, it can be seen that the second data bit 0 DATA_B0 is inverted only once in total.

At this time, it can be seen that the number of high logics of the second data error flag bit 0 EF_DATA_B0, the second DBI flag bit 0 DBI_B0, and the second DBI error flag bit 0 EF_DBI_B0 is 3, that is, odd.

That is, the inversion calculator 521 in accordance with the present embodiment may generate a second data final inversion flag INV_DATA_B0 of high logic, which is final signal to invert the second data bit DATA_B0 only once, when the number of high logics of the second data error flag bit 0 EF_DATA_B0, the second DBI flag bit 0 DBI_B0, and the second DBI error flag bit 0 EF_DBI_B0 is odd.

The second data final inversion flag bit 0 INV_DATA_B0 may be included in the second data final inversion flag INV_DATA_B<0:127>, and may be a signal corresponding to the second data bit 0 DATA_B0.

TABLE 16

| EF_DATA_B | DQ0 | DQ1 | DQ2 | DQ3 | DQ4 | DQ5 | DQ6 | DQ7 | DBI_B | EF_DBI_B |
|---|---|---|---|---|---|---|---|---|---|---|
| BL0 | 0 [1] | 16 [0] | 32 [0] | 48 [0] | 64 [0] | 80 [0] | 96 [0] | 112 [0] | 0 [1] | 0 [0] |

Table 16 shows the second data error flag group 0 EF_DATA_B0, EF_DATA_B16, EF_DATA_B32, EF_DATA_B48, EF_DATA_B64, EF_DATA_B80, EF_DATA_B96, and EF_DATA_B112, which correspond to the BL0 group, the second DBI flag bit 0 DBI_B0, and the second DBI error flag bit 0 EF_DBI_B0. In Table 16, [1] may mean high logic, and [0] may mean low logic.

It can be seen from Table 16 that the second data error flag bit 0 EF_DATA_B0 has high logic, the second DBI flag bit 0 DBI_B0 has high logic, and the second DBI error flag bit 0 EF_DBI_B0 has low logic.

That the second data error flag bit 0 EF_DATA_B0 is high logic means that an error exists in the second data bit 0 DATA_B0 corresponding to the second data error flag bit 0 EF_DATA_B0. Therefore, the second data bit 0 DATA_B0 must be inverted once.

In addition, since the second DBI flag bit 0 DBI_B0 is high logic and the second DBI error flag bit 0 EF_DBI_B0 is low logic, it means that an error does not exist in the second DBI flag bit 0 DBI_B0. Therefore, it can be seen that the second data bit 0 DATA_B0 is inverted twice by the second DBI flag bit 0 DBI_B0 of high logic, and thus has the existing logic.

At this time, it can be seen that the number of high logics of the second data error flag bit 0 EF_DATA_B0, the second DBI flag bit 0 DBI_B0, and the second DBI error flag bit 0 EF_DBI_B0 is 2, that is, even.

That is, the inversion calculator 521 in accordance with the present embodiment may generate a second data final inversion flag INV_DATA_B0 of low logic, which is final signal not to invert the second data bit DATA_B0, when the number of high logics of the second data error flag bit 0 EF_DATA_B0, the second DBI flag bit 0 DBI_B0, and the second DBI error flag bit 0 EF_DBI_B0 is even.

The second data final inversion flag bit 0 INV_DATA_B0 may be included in the second data final inversion flag INV_DATA_B<0:127>, and may be a signal corresponding to the second data bit 0 DATA_B0.

TABLE 17

| EF_DATA_B | DQ0 | DQ1 | DQ2 | DQ3 | DQ4 | DQ5 | DQ6 | DQ7 | DBI_B | EF_DBI_B |
|---|---|---|---|---|---|---|---|---|---|---|
| BL0 | 0 [1] | 16 [0] | 32 [0] | 48 [0] | 64 [0] | 80 [0] | 96 [0] | 112 [0] | 0 [0] | 0 [1] |

Table 17 shows the second data error flag group 0 EF_DATA_B0, EF_DATA_B16, EF_DATA_B32, EF_DATA_B48, EF_DATA_B64, EF_DATA_B80, EF_DATA_B96, and EF_DATA_B112, which correspond to the BL0 group, the second DBI flag bit 0 DBI_B0, and the second DBI error flag bit 0 EF_DBI_B0. In Table 17, [1] may mean high logic, and [0] may mean low logic.

It can be seen from Table 17 that the second data error flag bit 0 EF_DATA_B0 has high logic, the second DBI flag bit 0 DBI_B0 has low logic, and the second DBI error flag bit 0 EF_DBI_B0 has high logic.

That the second data error flag bit 0 EF_DATA_B0 is high logic means that an error exists in the second data bit 0 DATA_B0 corresponding to the second data error flag bit 0 EF_DATA_B0. Therefore, the second data bit 0 DATA_B0 must be inverted once.

In addition, since the second DBI flag bit 0 DBI_B0 is low logic and the second DBI error flag bit 0 EF_DBI_B0 is high logic, it means that an error exists in the second DBI flag bit 0 DBI_B0. Therefore, the logic of the error-corrected second DBI flag bit 0 DBI_B0 is high logic.

Therefore, it can be seen that the second data bit 0 DATA_B0 is inverted twice by the second DBI flag bit 0 DBI_B0 of high logic, and thus has the existing logic.

At this time, it can be seen that the number of high logics of the second data error flag bit 0 EF_DATA_B0, the second DBI flag bit 0 DBI_B0, and the second DBI error flag bit 0 EF_DBI_B0 is 2, that is, even.

That is, the inversion calculator 521 in accordance with the present embodiment may generate a second data final inversion flag INV_DATA_0 of low logic, which is final signal not to invert the second data bit DATA_B0, when the number of high logics of the second data error flag bit 0 EF_DATA_B0, the second DBI flag bit 0 DBI_B0, and the second DBI error flag bit 0 EF_DBI_B0 is even.

The second data final inversion flag bit 0 INV_DATA_B0 may be included in the second data final inversion flag INV_DATA_<0:127>, and may be a signal corresponding to the second data bit 0 DATA_0.

This is because, as described with reference to Tables 15 to 18, the inversion calculator 521 outputs the second data final inversion flag bit of high logic when the number of high logics of the second data error flag bit, the second DBI flag bit, and the second DBI error flag bit is odd, and outputs the second data final inversion flag bit of low logic when the number of high logics is even.

The second data final inversion flag bit 0 INV_DATA_B0 may be included in the second data final inversion flag INV_DATA_B<0:127>, and may be a signal corresponding to the second data bit 0 DATA_B0.

TABLE 18

| EF_DATA_B | DQ0 | DQ1 | DQ2 | DQ3 | DQ4 | DQ5 | DQ6 | DQ7 | DBI_B | EF_DBI_B |
|---|---|---|---|---|---|---|---|---|---|---|
| BL0 | 0 [1] | 16 [0] | 32 [0] | 48 [0] | 64 [0] | 80 [0] | 96 [0] | 112 [0] | 0 [0] | 0 [0] |

Table 18 shows the second data error flag group 0 EF_DATA_B0, EF_DATA_B16, EF_DATA_B32, EF_DATA_B48, EF_DATA_B64, EF_DATA_B80, EF_DATA_B96, and EF_DATA_B112, which correspond to the BL0 group, the second DBI flag bit 0 DBI_B0, and the second DBI error flag bit 0 EF_DBI_B0. In Table 18, [1] may mean high logic, and [0] may mean low logic.

It can be seen from Table 18 that the second data error flag bit 0 EF_DATA_B0 has high logic, the second DBI flag bit 0 DBI_B0 has low logic, and the second DBI error flag bit 0 EF_DBI_B0 has low logic.

That the second data error flag bit 0 EF_DATA_B0 is high logic means that an error exists in the second data bit 0 DATA_B0 corresponding to the second data error flag bit 0 EF_DATA_B0. Therefore, the second data bit 0 DATA_B0 must be inverted once.

In addition, since both the second DBI flag bit 0 DBI_B0 and the second DBI error flag bit 0 EF_DBI_B0 are low logic, it means that an error does not exist in the second DBI flag bit 0 DBI_B0, and it can be seen that the logic of the second DBI flag bit 0 DBI_B0 is low logic. Therefore, it can be seen that the second data bit 0 DATA_B0 is inverted only once in total.

At this time, it can be seen that the number of high logics of the second data error flag bit 0 EF_DATA_B0, the second DBI flag bit 0 DBI_B0, and the second DBI error flag bit 0 EF_DBI_B0 is 1, that is, odd.

That is, the inversion calculator 521 in accordance with the present embodiment may generate a second data final inversion flag INV_DATA_B0 of high logic, which is final signal to invert the second data bit DATA_B0 only once, when the number of high logics of the second data error flag bit 0 EF_DATA_B0, the second DBI flag bit 0 DBI_B0, and the second DBI error flag bit 0 EF_DBI_B0 is odd.

The inversion calculator 521 may generate the second data final inversion flag bit 0 INV_DATA_B0 by performing an XOR operation on the second data error flag bit 0 EF_DATA_B0, the second DBI flag bit 0 DBI_B0, and the second DBI error flag bit 0 EF_DBI_B0. That is, the inversion calculator 521 may generate the second data final inversion flag bit by performing an XOR operation on the second data error flag bit included in the second data error flag group EF_DATA_B_BL#, the second DBI flag bit corresponding to the second data error flag group EF_DATA_B_BL#, and the second DBI error flag bit corresponding to the second data error flag group EF_DATA_B_BL#.

The principle described with reference to Tables 15 to 18 may be equally applied to a case where the second data error flag bit 0 EF_DATA_B0 is low logic.

The inversion unit 523 may generate third data DATA_C<0:127> by determining whether the second data DATA_B<0:127> is finally inverted, based on the second data final inversion flag INV_DATA_B<0:127>.

The second data final inversion flag INV_DATA_B<0:127> may include a plurality of second data final inversion flag bits, and the second data final inversion flag bit may correspond to the second data bit. The third data may include a plurality of third data bits as in the second data, and the third data may also correspond to the second data bit and the second data final inversion flag bit.

When the second data final inversion flag bit is high logic, the inversion unit 523 may generate a third data bit by inverting the logic of the second data bit corresponding to the second data final inversion flag bit.

When the second data final inversion flag bit is low logic, the inversion unit 523 may generate the third data bit having the same logic as that of the second data bit corresponding to the second data final inversion flag bit.

The memory cell array 150 may store the third data DATA_C<0:127>.

As described above, according to the operation of the DBI unit 520 in accordance with the present embodiment, no inversion or only one inversion may be performed on the plurality of second data bits constituting the second data DATA_B<0:127>. Therefore, the power consumption in the operation of inverting the data bit can be minimized.

In accordance with embodiments, the entire latency of the memory system can be reduced through the DM unit that operates independently of the ECC unit.

In accordance with embodiments, the power consumption in the memory system can be reduced by minimizing the transmitted and received data bits of high logic.

In accordance with embodiments, the internal area of the memory system can be reduced by minimizing and simplifying the device and operation to which the function of the ECC unit and the function of the DM unit are redundantly applied.

In accordance with embodiments, the power consumption in the memory system can be reduced by minimizing the number of times of inversions of data.

Although various embodiments have been described for illustrative purposes, it will be apparent to those skilled in the art that various changes and modifications may be made without departing from the spirit and scope of the invention as defined in the following claims.

What is claimed is:

1. A memory system comprising:
an ECC unit suitable for generating third data by correcting second data and a third DBI flag by correcting a second DBI flag, based on the second data, the second DBI flag, and a second parity, which are provided through a channel;
a DBI unit suitable for generating fourth data by determining whether a plurality of third data bits respectively corresponding to a plurality of DBI flag bits constituting the third DBI flag are inverted, based on the third data and the third DBI flag; and
a DM unit suitable for generating a DM flag indicating whether a write operation is performed on a plurality of fourth data bits constituting the fourth data, based on the second data.

2. The memory system of claim 1, wherein the second data includes a plurality of second data groups, and
the DM unit generates a DM flag bit of high logic when the number of high logics of a plurality of bits included in each of the second data groups is equal to or greater than a masking value.

3. The memory system of claim 2, wherein the DM unit generates the DM flag bit of low logic when the number of high logics of the plurality of bits included in each of the second data groups is less than the masking value.

4. The memory system of claim 3, wherein the first data is original data before the second data passes through a channel, and
the first data includes a plurality of first data groups.

5. The memory system of claim 4, wherein the masking value is less than a data masking pattern boundary value, and
the data masking pattern boundary value is a boundary value of the number of high logics of a plurality of bits included in each of the first data groups so as to enable the DM unit to input high logic to the DM flag, regardless of single error occurrence of the plurality of bits included in each of the first data groups.

6. The memory system of claim 5, wherein the masking value is greater than a data pattern boundary value, and
the data pattern boundary value is a boundary value of the number of high logics of the plurality of bits included in each of the first data groups so as to enable the DM unit to input low logic to the DM flag, regardless of single error occurrence of the plurality of bits included in each of the first data groups.

7. The memory system of claim 6, wherein a fourth data group corresponding to the DM flag bit of high logic is a data group on which the write operation is not performed, and
the fourth data group corresponding to the DM flag bit of low logic is a data group on which the write operation is performed.

8. The memory system of claim 7, wherein the masking value is 6,
the data masking pattern boundary value is 7, and
the data pattern boundary value is 4.

9. A method of operating a memory system, the method comprising:
generating third data by correcting second data and a third DBI flag by correcting a second DBI flag, based on the second data, the second DBI flag, and a second parity, which are provided through a channel;
generating fourth data by determining whether a plurality of third data bits respectively corresponding to a plurality of DBI flag bits constituting the third DBI flag are inverted, based on the third data and the third DBI flag; and
generating a DM flag indicating whether a write operation is performed on a plurality of fourth data bits constituting the fourth data, based on the second data.

10. The method of claim 9, wherein the second data includes a plurality of second data groups, and
the generating of the DM flag comprises generating a DM flag bit of high logic when the number of high logics of a plurality of bits included in each of the second data groups is equal to or greater than a masking value.

11. The method of claim 10, wherein the generating of the DM flag comprises generating the DM flag bit of low logic when the number of high logics of the plurality of bits included in each of the second data groups is less than a masking value.

12. The method of claim 11, wherein the first data is original data before the second data passes through a channel, and
the first data includes a plurality of first data groups.

13. The method of claim 12, wherein the masking value is less than a data masking pattern boundary value, and
the data masking pattern boundary value is a boundary value of the number of high logics of a plurality of bits included in each of the first data groups so as to input high logic to the DM flag in the generating of the DM flag, regardless of single error occurrence of the plurality of bits included in each of the first data groups.

14. The method of claim 13, wherein the masking value is greater than a data pattern boundary value, and
the data pattern boundary value is a boundary value of the number of high logics of the plurality of bits included in each of the first data groups so as to input low logic to the DM flag in the generating of the DM flag, regardless of single error occurrence of the plurality of bits included in each of the first data groups.

15. The method of claim 14, further comprising:
not performing the write operation on a fourth data group corresponding to the DM flag bit of high logic; and
performing the write operation on the fourth data group corresponding to the DM flag bit of low logic.

16. The method of claim 15, wherein the masking value is 6,
the data masking pattern boundary value is 7, and
the data pattern boundary value is 4.

* * * * *